United States Patent
Suzuki

(10) Patent No.: US 11,769,243 B2
(45) Date of Patent: Sep. 26, 2023

(54) IMAGE INSPECTION DEVICE AND SAVING PROCESSING METHOD FOR CAPTURED IMAGE FOR INSPECTION BASED ON RECODING RESOLUTION

(71) Applicant: SCREEN HOLDINGS CO., LTD., Kyoto (JP)

(72) Inventor: Tomohiro Suzuki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/195,178

(22) Filed: Mar. 8, 2021

(65) Prior Publication Data
US 2021/0297537 A1    Sep. 23, 2021

(30) Foreign Application Priority Data
Mar. 23, 2020 (JP) .................. 2020-051303

(51) Int. Cl.
  *H04N 1/00* (2006.01)
  *G06T 7/00* (2017.01)
  *G06V 10/98* (2022.01)
(52) U.S. Cl.
  CPC ....... *H04N 1/00005* (2013.01); *G06T 7/0004* (2013.01); *H04N 1/0009* (2013.01); *H04N 1/00039* (2013.01); *G06T 2207/30144* (2013.01); *G06V 10/993* (2022.01)
(58) Field of Classification Search
  CPC ........... H04N 1/00005; H04N 1/00039; H04N 1/0009; G06T 7/0004; G06T 2207/30144; G06T 2207/10008; G06T 2207/30108; G06V 10/993; B41J 2/2142
  See application file for complete search history.

(56) References Cited

U.S. PATENT DOCUMENTS

2010/0149247 A1    6/2010  Mp et al.
2010/0251915 A1*  10/2010  Kasai .................... B41J 2/2142
                                                    101/484
2017/0064141 A1*   3/2017  Tsutsumi ............. G06V 30/413
(Continued)

FOREIGN PATENT DOCUMENTS

JP    2009-172966 A    8/2009
JP    2015-141093 A    8/2015
(Continued)

OTHER PUBLICATIONS

Japanese Notice of Reasons for Refusal issued in corresponding Japanese Patent Application No. 2020-051303, dated Aug. 1, 2023, with English translation.

*Primary Examiner* — Christopher Wait
(74) *Attorney, Agent, or Firm* — McDermott Will & Emery LLP

(57) ABSTRACT

An image inspection device is provided with: an imaging unit configured to capture a printed image; an inspection unit configured to inspect a captured image obtained by capturing the printed image by the imaging unit; an image storage unit configured to hold the captured image; and a saving processing unit configured to record the captured image into the image storage unit. The saving processing unit determines a recording resolution at a time of recording the captured image into the image storage unit, in accordance with a result of an inspection by the inspection unit.

20 Claims, 19 Drawing Sheets

(56) References Cited

U.S. PATENT DOCUMENTS

| | | |
|---|---|---|
| 2018/0086049 A1 | 3/2018 | Ueshima |
| 2018/0096472 A1 | 4/2018 | Ukishima |
| 2018/0241911 A1 | 8/2018 | Yasukaga |
| 2018/0262626 A1 | 9/2018 | Genda |
| 2019/0139220 A1 | 5/2019 | Akiyama |

FOREIGN PATENT DOCUMENTS

| | | |
|---|---|---|
| JP | 2016-182758 A | 10/2016 |
| JP | 2017-193075 A | 10/2017 |
| JP | 2018-051846 A | 4/2018 |
| JP | 2018-136248 A | 8/2018 |
| JP | 2018-151494 A | 9/2018 |
| JP | 2019-084743 A | 6/2019 |

\* cited by examiner

Fig.16

| INKJET HEAD (1) | 0.35 |
| INKJET HEAD (2) | 0.72 |
| INKJET HEAD (3) | 0.48 |
| INKJET HEAD (4) | 0.40 |
| ⋮ | ⋮ |

IMAGE INSPECTION DEVICE AND SAVING PROCESSING METHOD FOR CAPTURED IMAGE FOR INSPECTION BASED ON RECODING RESOLUTION

BACKGROUND OF THE INVENTION

Field of the Invention

The present invention relates to an image inspection device for inspecting a printed matter (printed image), and more particularly, to a saving processing method of saving a captured image for inspection into a storage unit.

Description of Related Art

In recent years, variable printing, in which different content is printed for each page, such as printing of a bill or a direct mail, has been performed widely. There is also a strong need to improve the quality of printed matter. For these reasons, the importance of the inspection of printed matter is increasing. Therefore, a printer (e.g., inkjet printer) provided with an image inspection device for inspecting a printing state is becoming common. The inspection by the image inspection device is performed, for example, by comparing and collating captured image data, obtained by capturing a printed recording medium (printing paper, etc.) with a camera or the like, with print data after raster image processor (RIP) processing which is data of a printing source. Such inspection can detect print defects (e.g., nozzle defect), ink stains, blurred characters, mixing of foreign matter, and the like.

The user of the printer has various requests concerning a captured image for inspection of printed matter, such as a request to perform visual inspection without touching the printed matter, a request to be able to submit printing content (a printed image immediately after printing) as evidence in accordance with a contract with a customer (ordering party of printing), and a request to be able to reconfirm printing content when the customer makes an inquiry after the shipment of the printed matter. Therefore, the user saves the captured image into a storage unit (typically, a hard disk) provided in the image inspection device, for example. That is, the user saves the captured image, obtained by capturing the printed matter by the image inspection device, into the storage unit so as to be able to confirm the printing content at any timing.

Note that the following related art documents are known in connection with the present invention. Japanese Laid-Open Patent Publication No 2016-182758 discloses a configuration of a conventional inkjet printer provided with an image inspection device. Japanese Laid-Open Patent Publication No 2017-193075 describes that imaging data, obtained by capturing a test chart for detecting the presence or absence of ink ejection failure, is recorded into a storage unit. Japanese Laid-Open Patent Publication No 2009-172966 discloses an invention of an inkjet image recording apparatus that can switch a reading resolution in capturing a recording medium after printing.

Conventionally, a recording resolution at the time when a captured image, obtained by capturing a printed matter by an image inspection device, is saved into a storage unit has been a fixed resolution. In other words, at the time of saving the captured image, the user has not been able to specify the recording resolution or to change the recording resolution appropriately. That is, in the conventional image inspection device, the recording resolution is set internally. In this regard, when the recording resolution is set to a low resolution, information of fine print defects (e.g., nozzle defect of one nozzle of an inkjet head, that is, the occurrence of a white streak due to ink ejection failure, etc.) is lost, and hence sufficient confirmation of the print defects cannot be made visually. On the other hand, in a case in which the recording resolution is set to a high resolution, a high-performance computer is required due to an increase in load of processing, such as resolution conversion at the time of saving a captured image, thereby making the cost high. Further, in a case in which the recording resolution is set to a high resolution, a large-capacity storage unit (hard disk, etc.) is required due to an increase in data size, thereby making the cost high. As described above, with respect to the high and low of the recording resolution, there is a trade-off relationship between a large amount of information obtained and the advantage in cost.

There has been proposed an image inspection device in which the recording resolution is switched depending on whether or not a captured image is a test image for inspecting the state of a nozzle. Referring to FIG. 21, a case where printing is performed on continuous paper will be described. FIG. 21 schematically shows a printed image printed on continuous paper, and one rectangular portion corresponds to a printed image for one sheet. In FIG. 21, a portion described as "sheet (i)" with i as an integer represents a normal image (image to be actually printed). Note that the same applies to FIGS. 6, 9, and 11.

In the example shown in FIG. 21, after the state of nozzles is first inspected on the basis of the printing result of a test image (that is, on the basis of captured image), the state of the nozzles is inspected on the basis of the printing result of a test image (that is, on the basis of captured image) every time normal images for 100 sheets are printed. The captured image of the test image is saved with a recording resolution of "200 dpi" regardless of the occurrence or non-occurrence of nozzle defect. The captured image of the normal image is saved with a recording resolution of "75 dpi" for each sheet. As described above, the captured image of the test image is saved into the storage unit with a high resolution, and the captured image of the normal image is saved into the storage unit with a low resolution. In the present specification, when focusing on the two resolutions, the higher one is referred to as "high resolution" and, the lower one is referred to as "low resolution".

As described above, in the example shown in FIG. 21, the recording resolution regarding the captured image of the test image is high resolution, and the recording resolution regarding the captured image of the normal image is low resolution. However, an image that is actually desired to be saved with a high resolution depends on the saving purpose of the user. For example, the image desired to be saved with a high resolution varies depending on a print defect that should be visually confirmed, the appearance of a print defect in one sheet, and the like. In a case in which printing on continuous paper is performed, a captured image desired to be saved with a high resolution and a captured image desired to be saved with a low resolution are mixed, but a dynamic change in recording resolution has not been achieved. That is, the conventional image inspection device has not efficiently saved the captured image for inspection while satisfying the user's request.

SUMMARY OF THE INVENTION

Accordingly, an object of the present invention is to provide an image inspection device (an inspection device for a printer) capable of dynamically changing a recording resolution so as to efficiently save a captured image for inspection.

One aspect of the present invention is directed to an image inspection device including:

an imaging unit configured to capture a printed image;

an inspection unit configured to inspect a captured image obtained by capturing the printed image by the imaging unit;

an image storage unit configured to hold the captured image; and a saving processing unit configured to record the captured image into the image storage unit, wherein the saving processing unit determines a recording resolution at a time of recording the captured image into the image storage unit, in accordance with a result of an inspection by the inspection unit.

According to such a configuration, the recording resolution at the time of recording a captured image for inspection into the image storage unit is determined in accordance with the result of the inspection by the inspection unit. Hence it is possible to save only a highly necessary captured image with a relatively high resolution. Thus, the captured image is efficiently saved, and the capacity of the image storage unit required for saving the captured image is reduced. As above, an image inspection device capable of dynamically changing a recording resolution so as to efficiently save the captured image for inspection is achieved.

Another aspect of the present invention is directed to an image inspection device including:

an imaging unit configured to capture a printed image;

an inspection unit configured to inspect a captured image obtained by capturing the printed image by the imaging unit;

an image storage unit configured to hold the captured image;

a saving processing unit configured to record the captured image into the image storage unit; and a browsing history storage unit configured to hold a browsing history of the captured image held in the image storage unit, wherein the saving processing unit determines a recording resolution at a time of recording the captured image into the image storage unit, on a basis of the browsing history held in the browsing history storage unit.

Still another aspect of the present invention is directed to a saving processing method for a captured image obtained by capturing a printed image, the method including:

an inspection step of inspecting the captured image; and a saving processing step of recording the captured image into a previously prepared image storage unit, wherein, in the saving processing step, a recording resolution at a time of recording the captured image into the image storage unit is determined in accordance with a result of an inspection in the inspection step.

These and other objects, features, modes, and advantageous effects of the present invention will become more apparent from the following detailed description of the present invention with reference to the accompanying drawings.

BRIEF DESCRIPTION OF THE DRAWINGS

FIG. 16 is a diagram showing an example of browsing rates for respective inkjet heads in the fifth embodiment;

DETAILED DESCRIPTION OF PREFERRED EMBODIMENTS

Embodiments of the present invention will be described below with reference to the accompanying drawings.

0. MATTERS COMMON TO ALL EMBODIMENTS

Before embodiments are described in detail, matters common to all embodiments will be described.

0.1 Overall Configuration of Printing System

Figure 1:
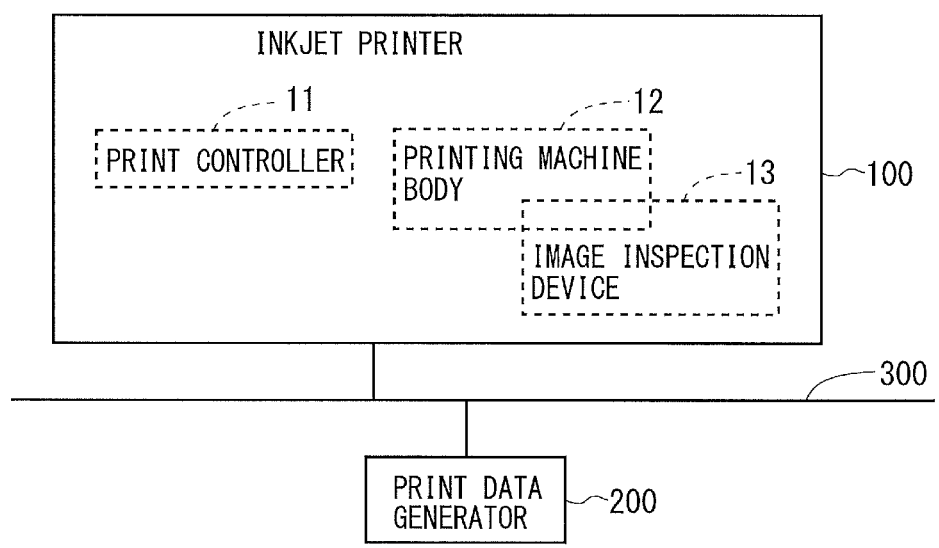
FIG. 1 is a block diagram showing an overall configuration of a printing system according to all embodiments of the present invention.

FIG. 1 is an overall configuration diagram of a printing system in all the embodiments. The printing system includes an inkjet printer 100 and a print data generator 200. The inkjet printer 100 and the print data generator 200 are connected to each other through a communication line 300. The print data generator 200 generates print data by performing RIP processing or the like on submitted data such as a portable document format (PDF) file. The print data generated by the print data generator 200 is transmitted to the inkjet printer 100 through the communication line 300. The inkjet printer 100 outputs a printed image to printing paper as a recording medium on the basis of print data transmitted from the print data generator 200 without using a printing plate. The inkjet printer 100 includes a printing machine body 12, a print controller 11 for controlling the operation of the printing machine body 12, and an image inspection device 13 for inspecting a printing state. That is, the inkjet printer 100 is a printer with an inspection function. Some components of the image inspection device 13 are incorporated in the printing machine body 12.

Although the image inspection device 13 is a component of the inkjet printer 100 (i.e., the image inspection device is included in the inkjet printer 100.) in the configuration shown in FIG. 1, the present invention is not limited thereto. The image inspection device 13 may be a single apparatus independent of the inkjet printer 100.

Although an example in which printing is performed on continuous paper will be described in the following embodiments, the present invention is not limited thereto. Even when printing is performed on a recording medium other than continuous paper, the present invention can be applied so long as a captured image for inspection is saved.

0.2 Configuration of Inkjet Printer

Figure 2:
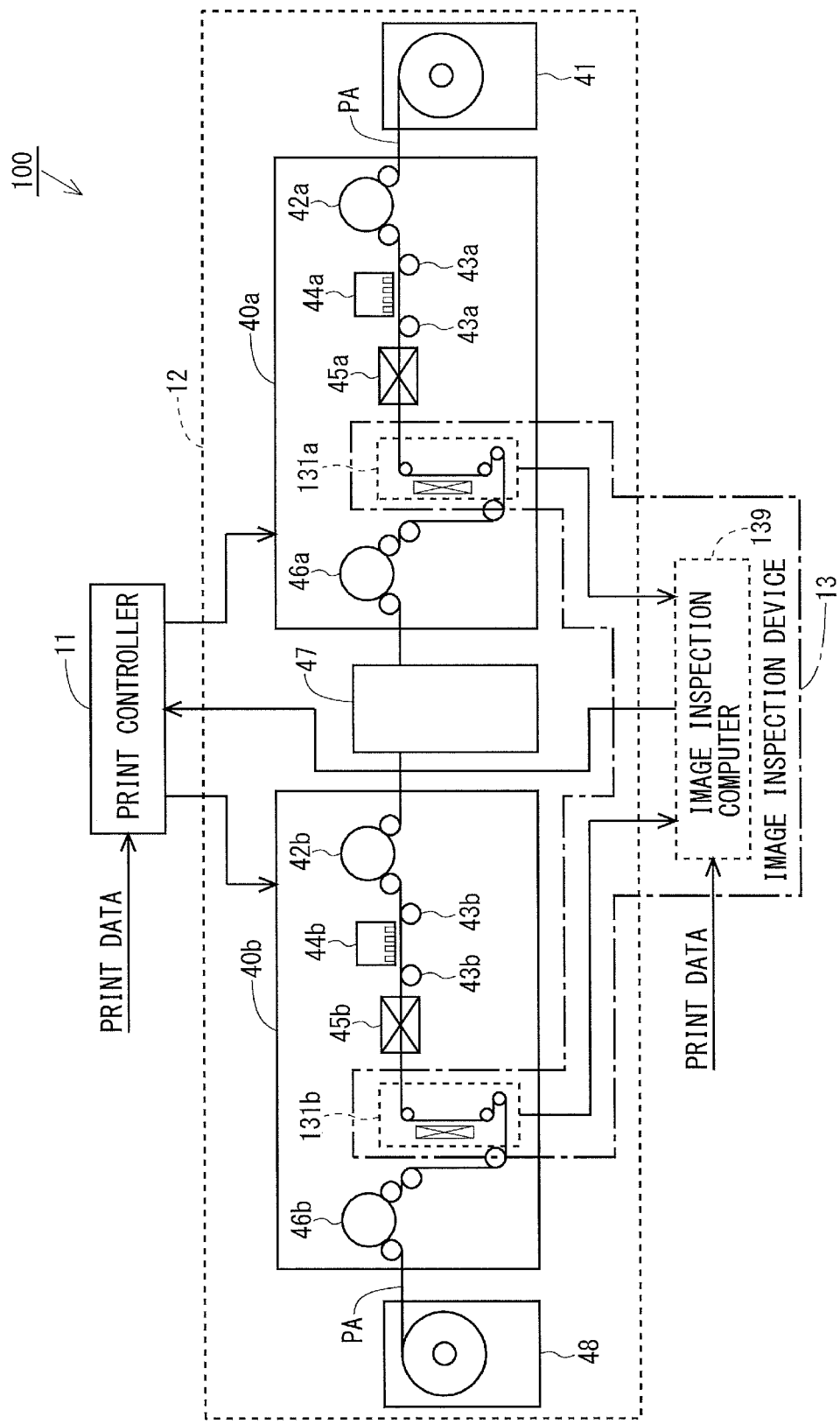
FIG. 2 is a schematic diagram showing a configuration example of an inkjet printer according to all the embodiments of the present invention.

FIG. 2 is a schematic diagram showing a configuration example of the inkjet printer 100. As described above, the inkjet printer 100 includes the print controller 11, the printing machine body 12, and the image inspection device 13.

The printing machine body 12 is provided with a paper feeding unit 41 for feeding printing paper (e.g., roll paper) PA which is a recording medium, a first printing mechanism 40a for performing printing on the front surface of the printing paper PA, a reversing unit 47 for reversing the front surface and the back surface of the printing paper PA having been outputted from the first printing mechanism 40a, a second printing mechanism 40b for performing printing on the back surface of the printing paper PA, and a paper winding unit 48 for winding the printed printing paper PA. The first printing mechanism 40a is provided with a first driving roller 42a for conveying the printing paper PA to the inside, a plurality of supporting rollers 43a for conveying the printing paper PA inside the first printing mechanism 40a, a printing unit 44a for performing printing by ejecting ink to the printing paper PA, a drying unit 45a for drying the printed printing paper PA, an imaging unit 131a for capturing a printed image (printed printing paper PA), and a second driving roller 46a for outputting the printing paper PA from the inside of the first printing mechanism 40a. The imaging unit 131a is a component of the image inspection device 13 and is configured using an image sensor such as a charge coupled device (CCD) or a complementary metal-oxide semiconductor (CMOS). The configuration of the second printing mechanism 40b is the same as the configuration of the first printing mechanism 40a. Note that each of the components of the first printing mechanism 40a is indicated by "a" at the end of its reference numeral, and each of the components of the second printing mechanism 40b is indicated by "b" at the end of its reference numeral.

The print controller 11 controls the operation of the printing machine body 12 having the configuration as above. When an instruction command for printing output is given to the print controller 11, the print controller 11 controls the operation of the printing machine body 12 so that the printing paper PA is conveyed from the paper feeding unit 41 to the paper winding unit 48. In each of the first printing mechanism 40a and the second printing mechanism 40b, first, the printing units 44a, 44b perform printing on the printing paper PA, then, the drying units 45a, 45b dry the printing paper PA, and finally, the imaging units 131a, 131b capture a printed image.

The image inspection device 13 is constituted by the imaging units 131a, 131b and an image inspection computer 139. The captured image data obtained by capturing the printed image by the imaging units 131a, 131b are sent to the image inspection computer 139. In the image inspection computer 139, for example, an inspection for detecting a print defect, and the like, are performed by comparing and collating the captured image data with the print data that is transmitted from the print data generator 200. While the print data is cyan-magenta-yellow-black (CMYK) format data, the captured image data is generally red-green-blue (RGB) format data. Therefore, prior to comparison and collation, processing for converting the print data from the CMYK format to the RGB format (color space conversion processing) is performed.

Figure 3:
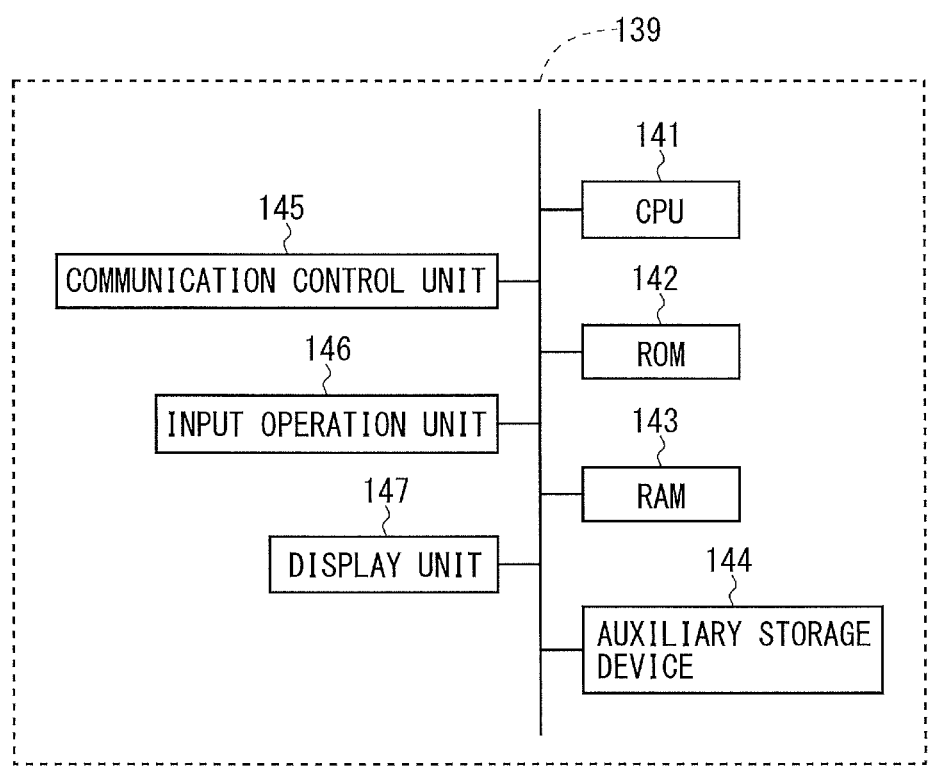
FIG. 3 is a hardware configuration diagram of an image inspection computer according to all the embodiments of the present invention.

FIG. 3 is a hardware configuration diagram of the image inspection computer 139. The image inspection computer 139 includes a central processing unit (CPU) 141, a read-only memory (ROM) 142, a random-access memory (RAM) 143, an auxiliary storage device 144, a communication control unit 145, an input operation unit 146, and a display unit 147. The CPU 141 performs various arithmetic processing and the like to control the whole of the image inspection computer 139. The ROM 142 is a read-only memory and stores, for example, an initial program to be executed by the CPU 141 when the image inspection computer 139 is started. The RAM 143 is a writable volatile memory and temporarily stores an active program, captured images, and the like. A temporary storage unit 132 to be described later is realized by this RAM 143. The auxiliary storage device 144 is a magnetic disk device or the like and stores various programs, captured images, and the like, which are to be held even when the power of the image inspection computer 139 is turned off. An image storage unit 135 to be described later is realized by this auxiliary storage device 144. The communication control unit 145 controls data transmission/reception with the outside of the image inspection computer 139. The input operation unit 146 is, for example, a keyboard or a mouse and receives an input operation by an operator. The display unit 147 displays an image on the basis of a command from the CPU 141.

Figure 4:
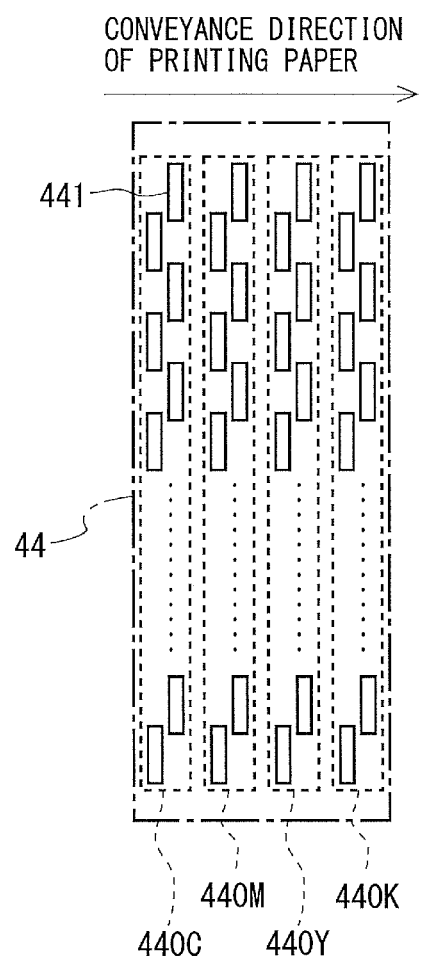
FIG. 4 is a plane view showing a configuration example of a printing unit according to all the embodiments of the present invention.

FIG. 4 is a plan view showing a configuration example of the printing unit 44 (44a, 44b). As shown in FIG. 4, the printing unit 44 is constituted by inkjet head rows 440C, 440M, 440Y, and 440K for color C (cyan), color M (magenta), color Y (yellow), and color K (black) arranged in the conveyance direction of the printing paper PA. Each inkjet head row is constituted by a plurality of inkjet heads 441 arranged in a zigzag shape. Each inkjet head 441 includes a large number of nozzles for ejecting ink. Each nozzle of the inkjet heads 441 included in the inkjet head row 440C for color C ejects cyan ink, each nozzle of the inkjet heads 441 included in the inkjet head row 440M for color M ejects magenta ink, each nozzle of the inkjet heads 441 included in the inkjet head row 440Y for color Y ejects yellow ink, and each nozzle of the inkjet heads 441 included in the inkjet head row 440K for color K ejects black ink.

Although the configuration of the inkjet printer 100 for performing color printing has been exemplified here, the present invention can also be applied to a case where an inkjet printer for performing monochrome printing is employed. Although the configuration of the inkjet printer 100 using the aqueous ink has been exemplified here, the present invention can also be applied to an inkjet printer using ultraviolet (UV) ink (ultraviolet curing ink) such as an inkjet printer for label printing. As above, the type of printer is not particularly limited.

0.3 Features

Next, features common to all the embodiments will be described. In all the embodiments, a plurality of resolutions are prepared as recording resolutions that are applicable when a captured image (an image obtained by capturing a printed image by the imaging units 131*a*, 131*b*) is saved. Specifically, as the applicable recording resolution, two resolutions (high resolution and low resolution) are prepared. Note that the "200 dpi" is given as an example of the high resolution, and "75 dpi" is given as an example of the low resolution. That is, "200 dpi" corresponds to a first resolution that is a relatively high resolution, and "75 dpi" corresponds to a second resolution that is a relatively low resolution. The recording resolution that is actually applied when the captured image is saved is dynamically switched without the user's operation. Hereinafter, the first to sixth embodiments (including modifications) will be described in detail.

1. FIRST EMBODIMENT

A first embodiment of the present invention will be described. In the present embodiment, a recording resolution is determined on the basis of the occurrence or non-occurrence of detection of nozzle defect in an inspection of a captured image regarding a test image.

1.1 Configuration of Inspection Device

Figure 5:
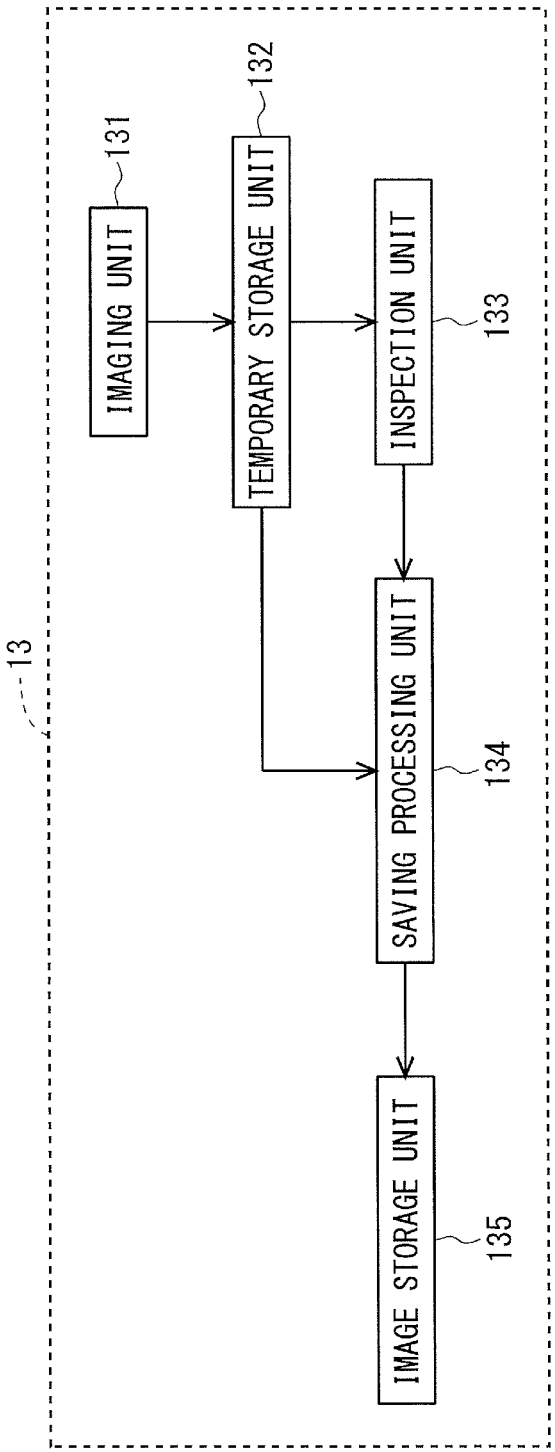
FIG. 5 is a block diagram showing a functional configuration of an image inspection device according to a first embodiment of the present invention.

FIG. 5 is a block diagram showing a functional configuration of the image inspection device 13 in the present embodiment. The image inspection device 13 functionally includes an imaging unit 131, the temporary storage unit 132, an inspection unit 133, a saving processing unit 134, and the image storage unit 135. Note that the temporary storage unit 132, the inspection unit 133, the saving processing unit 134, and the image storage unit 135 are components provided inside the image inspection computer 139 shown in FIG. 2. The imaging unit 131 captures a printed image (printed printing paper PA). A captured image, obtained by capturing the printed image by the imaging unit 131, is first recorded into the temporary storage unit 132. The inspection unit 133 inspects the captured image recorded in the temporary storage unit 132. The saving processing unit 134 records the captured image, recorded in the temporary storage unit 132, into the image storage unit 135. At this time, the saving processing unit 134 determines the recording resolution in accordance with the result of the inspection by the inspection unit 133. The image storage unit 135 holds the captured image recorded by the saving processing unit 134.

1.2 Inspection Performed in Inspection Unit

In the present embodiment, in the inspection unit 133, captured images regarding a test image to be printed on the printing paper PA at predetermined intervals are inspected. The test image is an image of a pattern by which nozzle defect can be detected. That is, the inspection unit 133 performs inspections for determining the occurrence or non-occurrence of nozzle defect at fixed intervals throughout the period during a which printing is performed on the continuous paper.

1.3 Saving Processing

Figure 6:
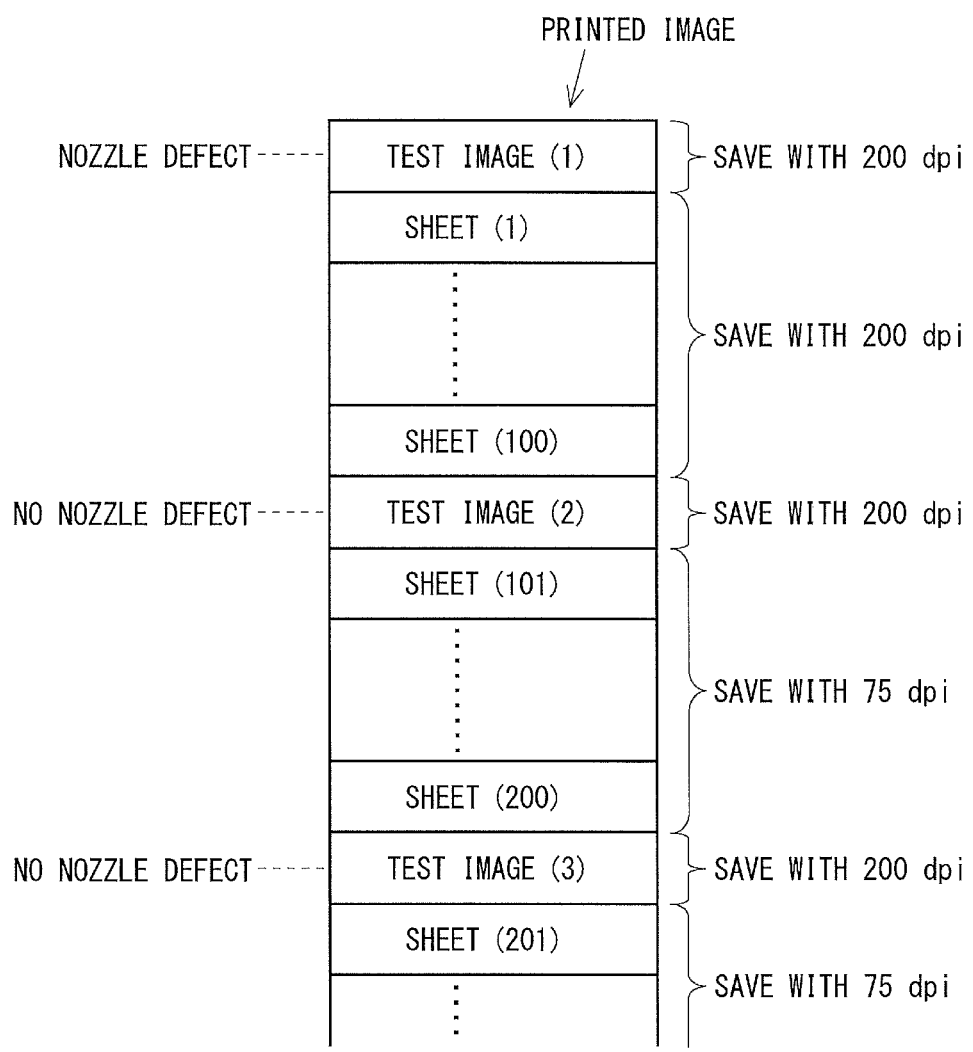
FIG. 6 is a diagram for explaining the switching of a recording resolution in the first embodiment.

Next, the processing of saving (recording) the captured image into the image storage unit 135 performed by the saving processing unit 134 will be described in detail. FIG. 6 is a diagram for explaining the switching of the recording resolution in the present embodiment. As understood from FIG. 6, in the present embodiment, after the state of nozzles is first inspected on the basis of the printing result of a test image (that is, on the basis of captured image), the state of the nozzles is inspected on the basis of the printing result of a test image (that is, on the basis of captured image) every time normal images for 100 sheets are printed. The captured image of the test image is saved with a recording resolution of "200 dpi" regardless of the occurrence or non-occurrence of nozzle defect. The captured image of the normal image is saved with either the recording resolution of "200 dpi" or the recording resolution of "75 dpi" in accordance with the result of the latest inspection. More specifically, when nozzle defect has been detected by the latest inspection, the captured image of the normal image is saved with the recording resolution of "200 dpi", and when nozzle defect has not been detected by the latest inspection, the captured image of the normal image is saved with the recording resolution of "75 dpi". As thus described, when nozzle defect has been detected by the latest inspection, the captured image of the normal image is recorded into the image storage unit 135 with a high resolution, and when nozzle defect has not been detected by the latest inspection, the captured image of the normal image is recorded into the image storage unit 135 with a low resolution.

As described above, in the present embodiment, the saving processing unit 134 determines, in accordance with the result of the inspection by the inspection unit 133 at a certain timing, the recording resolution of each captured image (captured image regarding the normal image) until the result of the next inspection by the inspection unit 133 is obtained. When it is determined that there is nozzle defect as a result of the inspection by the inspection unit 133 at a certain timing, the saving processing unit 134 determines the recording resolution of each captured image (captured image regarding the normal image), until the result of the next inspection by the inspection unit 133 is obtained, to be a high resolution (200 dpi, here). When it is determined that there is no nozzle defect as a result of the inspection by the inspection unit 133 at a certain timing, the saving processing unit 134 determines the recording resolution of each captured image (captured image regarding the normal image), until the result of the next inspection by the inspection unit 133 is obtained, to be a low resolution (75 dpi, here).

Figure 7:
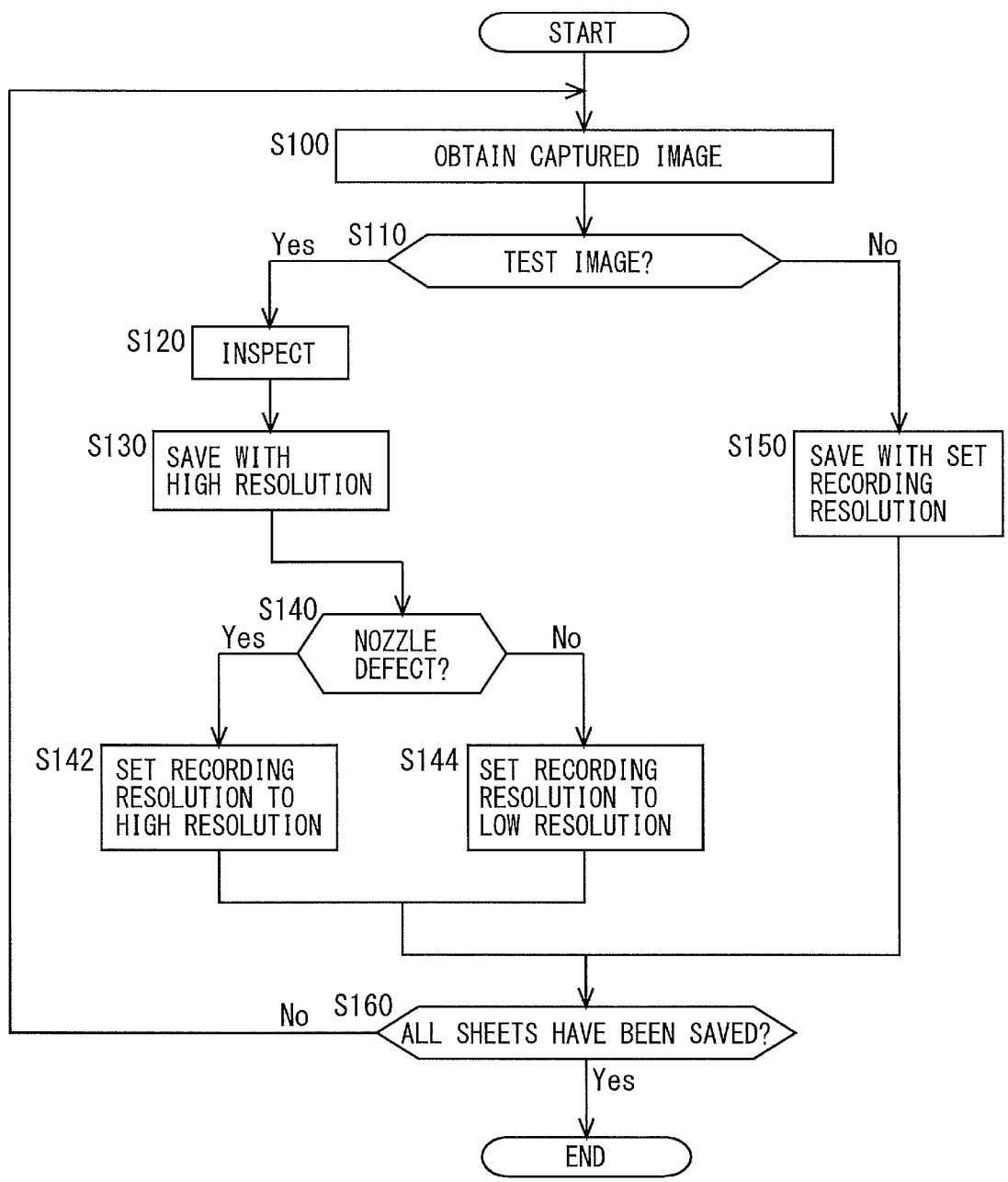
FIG. 7 is a flowchart showing a procedure for a series of processing related to the saving of a captured image in the first embodiment.

FIG. 7 is a flowchart showing a procedure for a series of processing related to the saving of a captured image. First, a captured image for one sheet is obtained (step S100). Next, it is determined whether or not the captured image obtained in step S100 is a test image (step S110). When the captured image is a test image as a result of the determination in step S110, the processing proceeds to step S120, and when the captured image is not a test image (i.e., when the captured image is a normal image), the processing proceeds to step S150.

In step S120, an inspection for determining the occurrence or non-occurrence of nozzle defect is performed. The captured image for the test image is saved into the image storage unit 135 with a high resolution (step S130). Thereafter, a determination is made as to whether or not nozzle defect has been detected by the inspection in step S120 (step S140). When nozzle defect has been detected as a result of the determination in step S140, the processing proceeds to step S142, and when the nozzle defect has not been detected, the processing proceeds to step S144. In step S142, the recording resolution at the time of saving the captured image into the image storage unit 135 is set to a high resolution. In step S144, the recording resolution at the time of saving the captured image into the image storage unit 135 is set to a low resolution. After the completion of step S142 or step S144, the processing proceeds to step S160.

In step S150, the captured image is saved into the image storage unit 135 with the set recording resolution. Note that the captured image saved in the image storage unit 135 in step S150 is the captured image regarding the normal image. After the completion of step S150, the processing proceeds to step S160.

In step S160, it is determined whether or not the captured images for all the sheets have been saved into the image storage unit 135. When the captured images for all the sheets have been saved as a result of the determination in step S160, the series of saving processing is ended, and when there is a captured image having not been saved, the processing returns to step S100.

From the above, at the time of processing for a captured image regarding a test image (1) in FIG. 6, for example, it is determined in step S140 that there is nozzle defect, and hence the recording resolution is set to a high resolution (step S142). Thus, captured images for a sheet (1) to a sheet (100) in FIG. 6 are saved into the image storage unit 135 with a high resolution (200 dpi, here) in step S150. Further, at the time of processing for a captured image regarding a test image (2) in FIG. 6, for example, it is determined in step S140 that there is no nozzle defect, and hence the recording resolution is set to a low resolution (step S144). Thus, captured images for a sheet (101) to a sheet (200) in FIG. 6 are saved into the image storage unit 135 with a low resolution (75 dpi, here) in step S150.

In the present embodiment, an inspection step is realized by step S120, and the saving processing step is realized by steps S140, S142, S144, and S150.

1.4 Effects

According to the present embodiment, the recording resolution at the time of saving the captured image of the normal image into the image storage unit 135 is determined in accordance with the result of the inspection for determining the occurrence or non-occurrence of nozzle defect. When nozzle defect has been detected by the latest inspection, the captured image of the normal image is saved into the image storage unit 135 with a high resolution, and when nozzle defect has not been detected by the latest inspection, the captured image of the normal image is saved into the image storage unit 135 with a low resolution. As thus described, it is possible to efficiently save the captured image for inspection while satisfying the user's request. As described above, according to the present embodiment, the image inspection device (inspection device for inkjet printer 100) 13 capable of dynamically changing a recording resolution so as to efficiently save a captured image for inspection is achieved.

1.5 Modification

Modifications of the first embodiment will be described below.

1.5.1 First Modification

Figure 8:
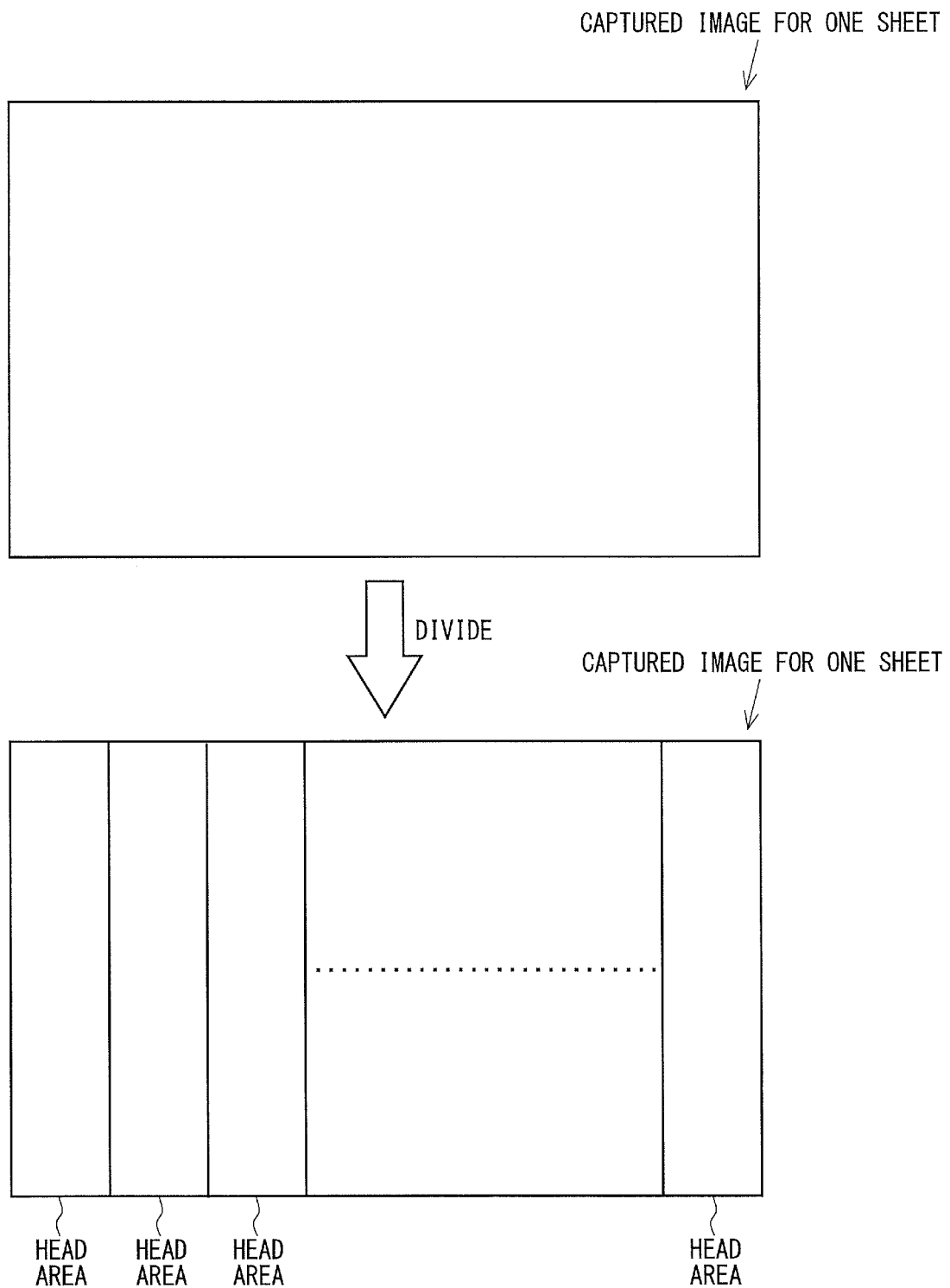
FIG. 8 is a diagram for explaining that the recording resolution is determined for each head area in a first modification of the first embodiment.

In the first embodiment, regarding each captured image, the whole image for one sheet has been saved into the image storage unit 135 with the same recording resolution. However, the present invention is not limited thereto. The captured image may be saved with different resolutions depending on location in one sheet. That is, the recording resolution may be determined for each of areas obtained by dividing a sheet into a plurality of sections. For example, the recording resolution may be determined for each head area to be printed by each inkjet head 441 (see FIG. 8).

By determining the recording resolution for each area in this way, it is possible to save the captured image for inspection into the image storage unit 135 more efficiently.

1.5.2 Second Modification

According to the first embodiment, there may be a case where captured images for a large number of sheets are saved with a high resolution. Therefore, the configuration may be such that a threshold is set in advance, and when the number of sheets (captured images) to be saved with a high resolution in the flow shown in FIG. 7 becomes larger than the threshold, only some of those are saved with a high resolution into the image storage unit 135 (e.g., only one sheet per ten sheets is saved into the image storage unit 135 with a high resolution.).

According to the present modification, it is possible to prevent the occurrence of a capacity shortage of the image storage unit 135 caused by saving a large number of captured images with a high resolution.

2. SECOND EMBODIMENT

A second embodiment of the present invention will be described. In the present embodiment, the recording resolution is determined for each sheet on the basis of the number of print defects detected by the inspection.

The functional configuration of the image inspection device 13 is similar to that in the first embodiment (see FIG. 5). However, the content of the inspection performed in the inspection unit 133 and the operation of the saving processing unit 134 are different from those of the first embodiment. In the present embodiment, the inspection unit 133 inspects the captured images for all the sheets. The inspection performed in the inspection unit 133 is an inspection for detecting print defects. The operation of the saving processing unit 134 will be described later.

2.1 Saving Processing

Figure 9:
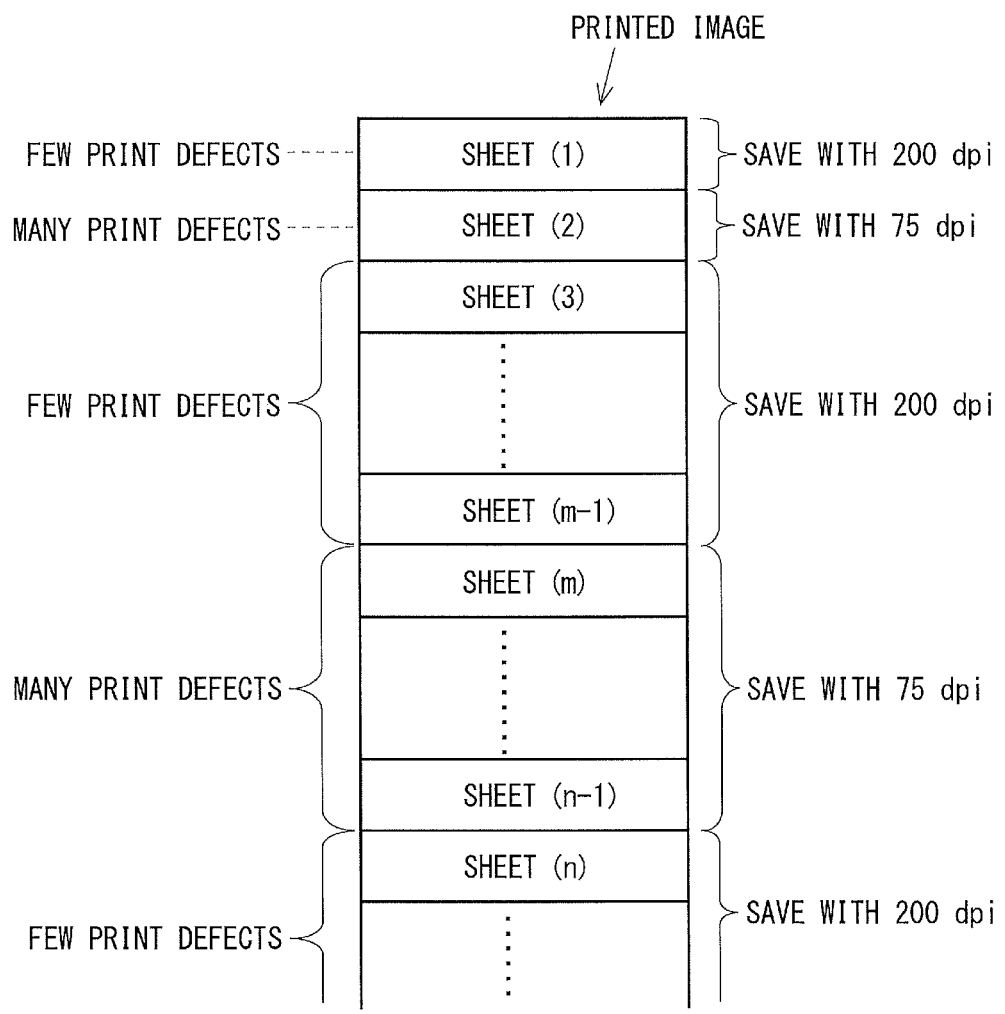
FIG. 9 is a diagram for explaining the switching of a recording resolution in a second embodiment of the present invention.

The details of the processing of saving (recording) the captured image into the image storage unit 135 performed by the saving processing unit 134 will be described. FIG. 9 is a diagram for explaining the switching of the recording resolution in the present embodiment. As can be seen from FIG. 9, in the present embodiment, regarding a captured image of each sheet, when there are few print defects, the captured image is saved with a recording resolution of "200 dpi", and when there are many print defects, the captured image is saved with a recording resolution of "75 dpi". Specifically, a threshold is set in advance, and a captured image regarding a sheet, in which the number of print defects detected by the inspection is smaller than the threshold, is saved with the recording resolution of "200 dpi", and a captured image regarding a sheet, in which the number of print defects detected by the inspection is larger than the threshold, is saved with the recording resolution of "75 dpi". As thus described, the captured image in which no print defect has been detected and the captured image in which a relatively small number of print defects have been detected, are recorded into the image storage unit 135 with a high resolution, and the captured image in which a relatively large number of print defects have been detected is recorded into the image storage unit 135 with a low resolution. Note that the reason for switching the recording resolution in this way is that, in the present embodiment, an operation is assumed where "a sheet having few print defects is visually confirmed, and a sheet having many print defects is reprinted without visual confirmation".

As described above, in the present embodiment, the saving processing unit 134 determines the recording resolution of the captured image regarding the sheet, in which the number of print defects detected by the inspection by the inspection unit 133 is smaller than the predetermined number, to be a high resolution (200 dpi, here) and determines the recording resolution of the captured image regarding the sheet, in which the number of print defects detected by the inspection by the inspection unit 133 is larger than the predetermined number, to be a low resolution (75 dpi, here).

Figure 10:
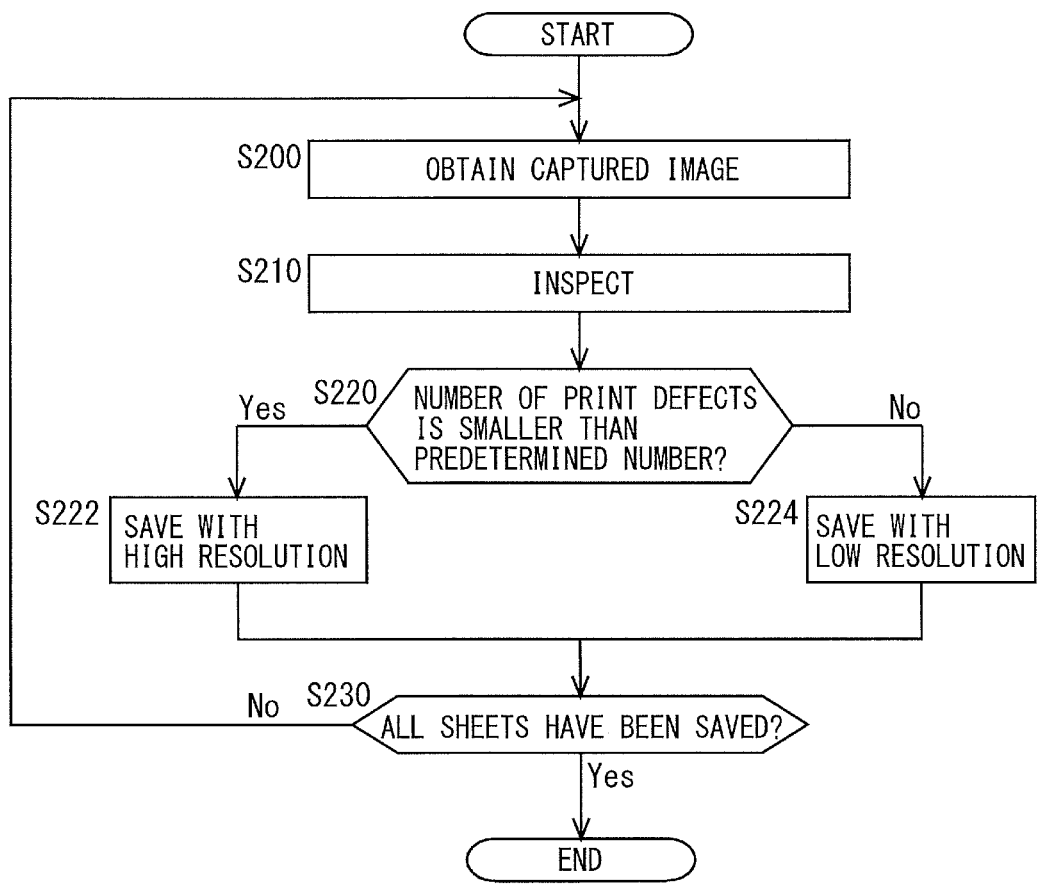
FIG. 10 is a flowchart showing a procedure for a series of processing related to the saving of a captured image in the second embodiment.

FIG. 10 is a flowchart showing a procedure for a series of processing related to the saving of a captured image. First, a captured image for one sheet is obtained (step S200). Next, the inspection unit 133 performs an inspection for detecting print defects (step S210). Thereafter, it is determined whether or not the number of print defects detected in the inspection in step S210 is smaller than a predetermined number (threshold) (step S220). When the number of detected print defects is smaller than the predetermined number as a result of the determination in step S220, the processing proceeds to step S222, and when the number of detected print defects is equal to or larger than the predetermined number, the processing proceeds to step S224.

In step S222, the captured image regarding the target sheet is saved into the image storage unit 135 with a high resolution. In step S224, the captured image regarding the target sheet is saved into the image storage unit 135 with a low resolution. After the completion of step S222 or step S224, the processing proceeds to step S230.

In step S230, it is determined whether or not the captured images for all the sheets have been saved into the image storage unit 135. When the captured images for all the sheets have been saved as a result of the determination in step S230, the series of saving processing is ended, and when there is a captured image having not been saved, the processing returns to step S200.

From the above, for example, at the time of processing for captured images regarding a sheet (3) to a sheet (m−1) shown in FIG. 9, it is determined in step S220 that the number of detected print defects is smaller than a predetermined number. Thus, the captured images regarding the sheet (3) to the sheet (m−1) in FIG. 9 are saved into the image storage unit 135 with a high resolution (200 dpi, here) (step S222). Further, for example, at the time of processing for captured images regarding a sheet (m) to a sheet (n−1) shown in FIG. 9, it is determined in step S220 that the number of detected print defects is equal to or larger than the predetermined number. Thus, the captured images regarding the sheet (m) to the sheet (n−1) in FIG. 9 are saved into the image storage unit 135 with a low resolution (75 dpi, here) (step S224).

In the present embodiment, the inspection step is realized by step S210, and the saving processing step is realized by steps S220, S222, and S224.

2.2 Effects

According to the present embodiment, the recording resolution at the time of saving the captured image of each sheet into the image storage unit 135 is determined in accordance with the result of the print defect detection inspection performed for each sheet. A captured image regarding a sheet, in which the number of print defects detected by the inspection is smaller than the predetermined number, is saved into the image storage unit 135 with a high resolution, and a captured image regarding a sheet, in which the number of print defects detected by the inspection is equal to or larger than the predetermined number, is saved into the image storage unit 135 with a low resolution. As thus described, it is possible to efficiently save the captured image for inspection while satisfying the user's request. As described above, similarly to the first embodiment, in the present embodiment as well, the image inspection device (inspection device for inkjet printer 100) 13 capable of dynamically changing a recording resolution so as to efficiently save a captured image for inspection is achieved.

2.3. Modification

In the second embodiment, the captured image regarding the sheet, in which the number of print defects is smaller than the threshold, is saved with a high resolution, and the captured image regarding the sheet, in which the number of print defects is larger than the threshold, is saved with a low resolution. However, on the contrary, the configuration may be such that the captured image regarding the sheet, in which the number of print defects is smaller than the threshold, is saved with a low resolution, and the captured image regarding the sheet, in which the number of defects is larger than the threshold is saved with a low resolution.

In this regard, for example, in a case in which an operation that "visual confirmation is briefly performed regarding a sheet having few print defects, and visual confirmation is sufficiently performed into details regarding a sheet having many print defects" is adopted, the recording resolution may be switched by the method of the present modification. As shown in the second embodiment and the present modification, the resolution at the time of saving the captured image may be determined on the basis of the number of print defects detected by the inspection.

3. THIRD EMBODIMENT

A third embodiment of the present invention will be described. In the present embodiment, the recording resolution is determined for each sheet on the basis of the size of a print defect detected by the inspection.

The functional configuration of the image inspection device 13 is similar to that in the first embodiment (see FIG. 5). However, the content of the inspection performed in the inspection unit 133 and the operation of the saving processing unit 134 are different from those of the first embodiment. In the present embodiment, the inspection unit 133 inspects the captured images for all the sheets. The inspection performed in the inspection unit 133 is an inspection for detecting print defects. The operation of the saving processing unit 134 will be described later.

3.1 Saving Processing

Figure 11:
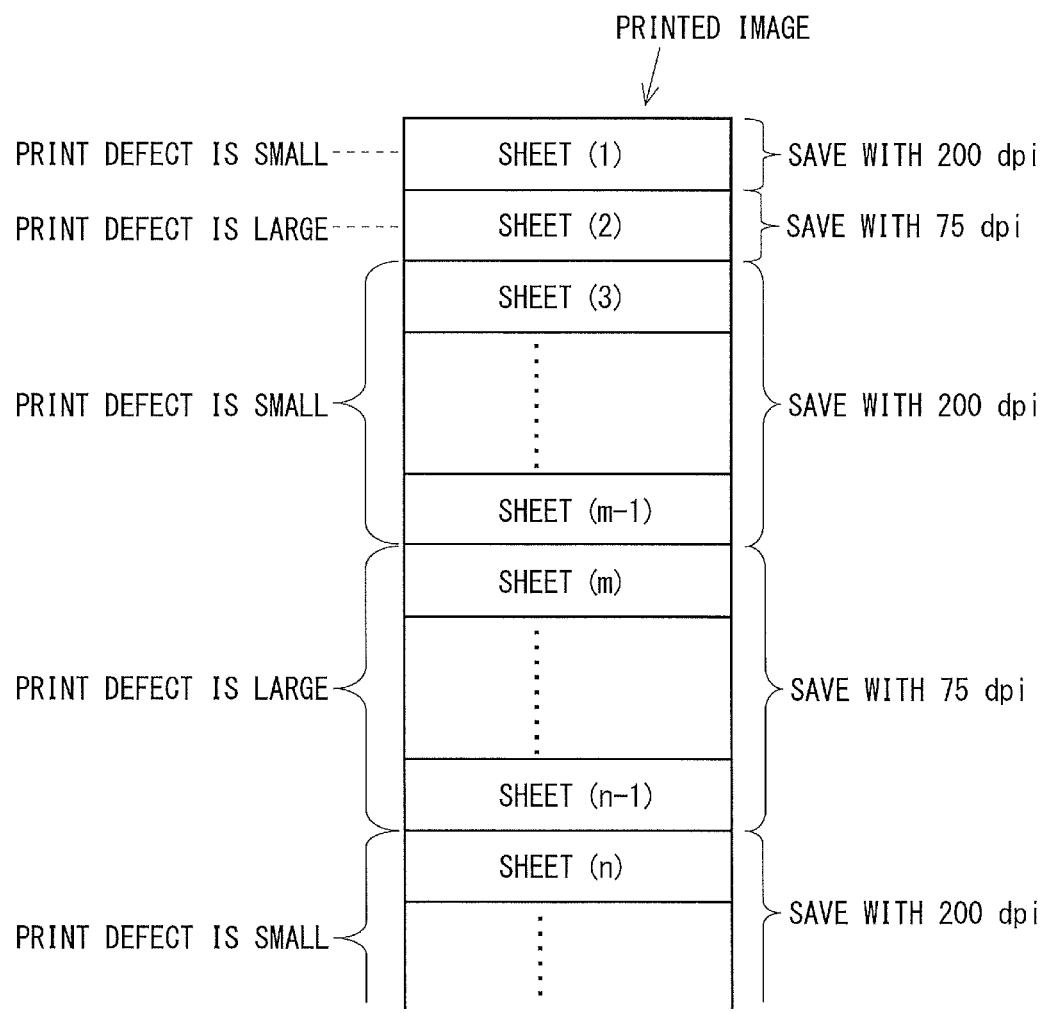
FIG. 11 is a diagram for explaining the switching of a recording resolution in a third embodiment of the present invention.

The details of the processing of saving (recording) the captured image into the image storage unit 135 performed by the saving processing unit 134 will be described. FIG. 11 is a diagram for explaining the switching of the recording resolution in the present embodiment. As can be seen from FIG. 11, in the present embodiment, regarding a captured image of each sheet, when a print defect is small, the captured image is saved with a recording resolution of "200 dpi", and when a print detect is large, the captured image is saved with a recording resolution of "75 dpi". Specifically, a threshold is set in advance, and a captured image regarding a sheet, in which a print defect of a size smaller than the threshold has been detected by the inspection, is saved with the recording resolution of "200 dpi", and a captured image regarding a sheet, in which only a print defect of a size larger than the threshold has been detected by the inspection, is saved with the recording resolution of "75 dpi". As thus described, the captured image in which a small-sized print defect has been detected is recorded into the image storage unit 135 with a high resolution, and the captured image in which only a large-sized print defect has been detected is recorded into the image storage unit 135 with a low resolution. Note that the captured image, in which no print defect has been detected, is recorded into the image storage unit 135 with a high resolution.

As described above, in the present embodiment, the saving processing unit 134 determines a recording resolution of a captured image regarding a sheet, in which a print defect of a size smaller than a predetermined size is detected by the inspection by the inspection unit 133, to be a high resolution (200 dpi, here) and determines a recording resolution of a captured image regarding a sheet, in which only a print defect of a size larger than the predetermined size has been detected by the inspection by the inspection unit 133, to be a low resolution (75 dpi, here).

A procedure for a series of processing related to the saving of the captured image is substantially the same as in the second embodiment described above (see FIG. 10). However, in step S220 of FIG. 10, it is determined whether or not a print defect of a size smaller than the threshold has been detected. Then, when a print defect of a size smaller than the threshold has been detected as a result of the determination in step S220, the processing proceeds to step S222, and when only a print defect of a size larger than the threshold has been detected, the processing proceeds to step S224. When no print defect has been detected as a result of the determination in step S220, the processing proceeds to step S222.

3.2 Effect

According to the present embodiment, the recording resolution at the time of saving the captured image of each sheet into the image storage unit 135 is determined in accordance with the result of the print defect detection inspection performed for each sheet. A captured image regarding a sheet, in which a print defect of a size smaller than the threshold has been detected by the inspection, is saved into the image storage unit 135 with a high resolution, and a captured image regarding a sheet, in which only a print defect of a size larger than the threshold has been detected by the inspection, is saved into the image storage unit 135 with a low resolution. As thus described, it is possible to efficiently save the captured image for inspection while satisfying the user's request. As described above, similarly to the first embodiment, in the present embodiment as well, the image inspection device (inspection device for inkjet printer 100) 13 capable of dynamically changing a recording resolution so as to efficiently save a captured image for inspection is achieved.

3.3 Modification

In the third embodiment, the recording resolution is determined on the basis of the size of the print defect detected by the inspection. However, alternatively, the recording resolution may be determined on the basis of the type of print defect detected by the inspection.

4. FOURTH EMBODIMENT

A fourth embodiment of the present invention will be described. In the present embodiment, the user can select a condition for setting a recording resolution of a captured image to a high resolution out of a plurality of conditions.

4.1 Configuration of Inspection Device

Figure 12:
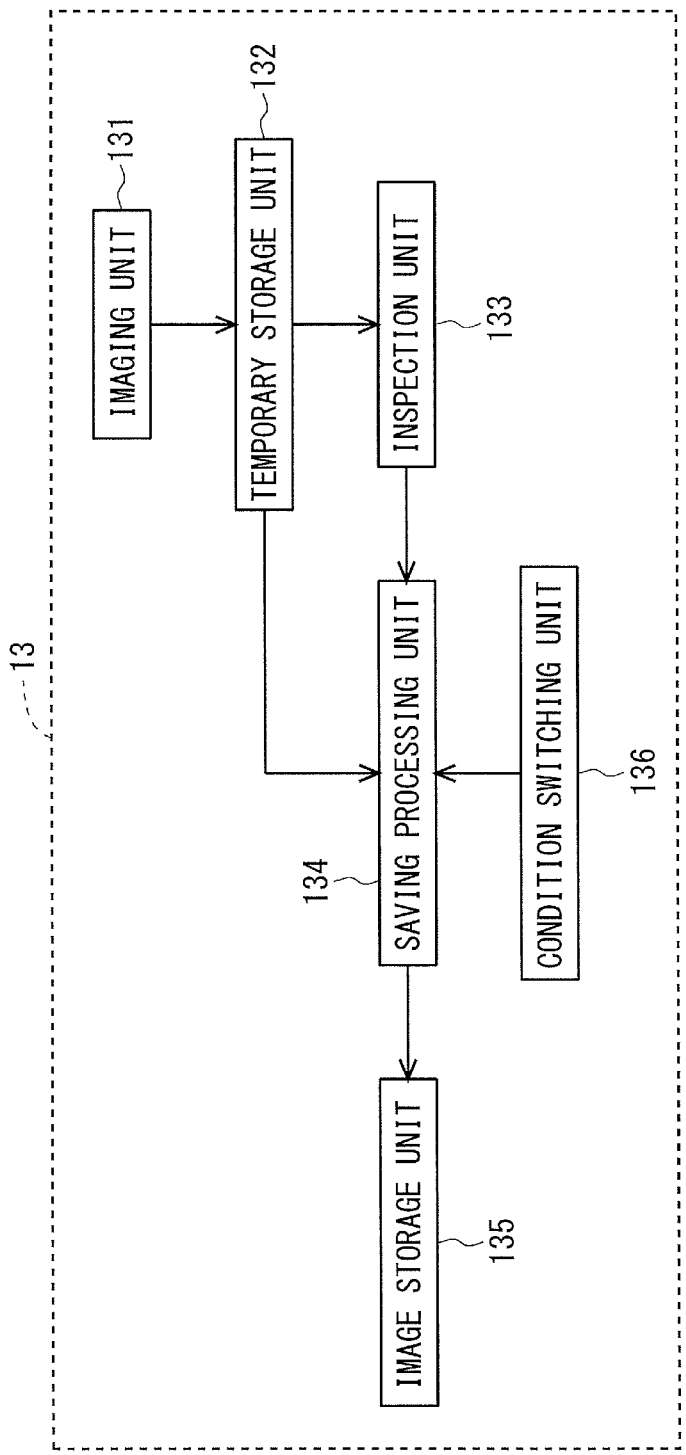
FIG. 12 is a block diagram showing a functional configuration of an image inspection device according to a fourth embodiment of the present invention.

FIG. 12 is a block diagram showing a functional configuration of the image inspection device 13 in the present embodiment. The image inspection device 13 functionally includes an imaging unit 131, the temporary storage unit 132, an inspection unit 133, a saving processing unit 134, the image storage unit 135, and a condition switching unit 136. Note that the temporary storage unit 132, the inspection unit 133, the saving processing unit 134, the image storage unit 135, and the condition switching unit 136 are components provided inside the image inspection computer 139 shown in FIG. 2. The imaging unit 131 captures a printed image (printed printing paper PA). A captured image, obtained by capturing the printed image by the imaging unit 131, is first recorded into the temporary storage unit 132. The inspection unit 133 inspects the captured image recorded in the temporary storage unit 132. In the present embodiment, the inspection performed in the inspection unit 133 is an inspection for detecting print defects.

The condition switching unit 136 switches a condition related to the determination of the recording resolution (specifically, a condition for setting the recording resolution of the captured image to a high resolution) in accordance with a selection operation by the user. In this regard, in the second embodiment, whether the recording resolution is set to be a high resolution or a low resolution has been determined in accordance with the number of print defects. Specifically, regarding each sheet, the fact that the number of print defects detected by the inspection is smaller than the threshold is set as the condition for setting the recording resolution of the captured image to be a high resolution. In the third embodiment, whether the recording resolution is set to be a high resolution or a low resolution has been determined in accordance with the size of the print defect. Specifically, regarding each sheet, the fact that a print defect of a size smaller than the threshold has been detected by the inspection is set as the condition for setting the recording resolution of the captured image to be a high resolution. In the present embodiment, a condition similar to that in the second embodiment and a condition similar to that in the third embodiment are prepared, and the condition switching unit 136 selects a condition, which is actually applied at the time of determining the recording resolution, out of those two conditions.

The saving processing unit 134 records the captured image, recorded in the temporary storage unit 132, into the image storage unit 135. At this time, the saving processing unit 134 determines the recording resolution according to the condition selected by the condition switching unit 136. The image storage unit 135 holds the captured image recorded by the saving processing unit 134.

Here, although a case is illustrated where two conditions are provided as conditions for setting the recording resolution of the captured image to a high resolution, the present invention is not limited thereto. Three or more conditions may be provided as conditions for setting the recording resolution of the captured image to a high resolution.

4.2 Switching of Condition and Saving Processing

Figure 13:
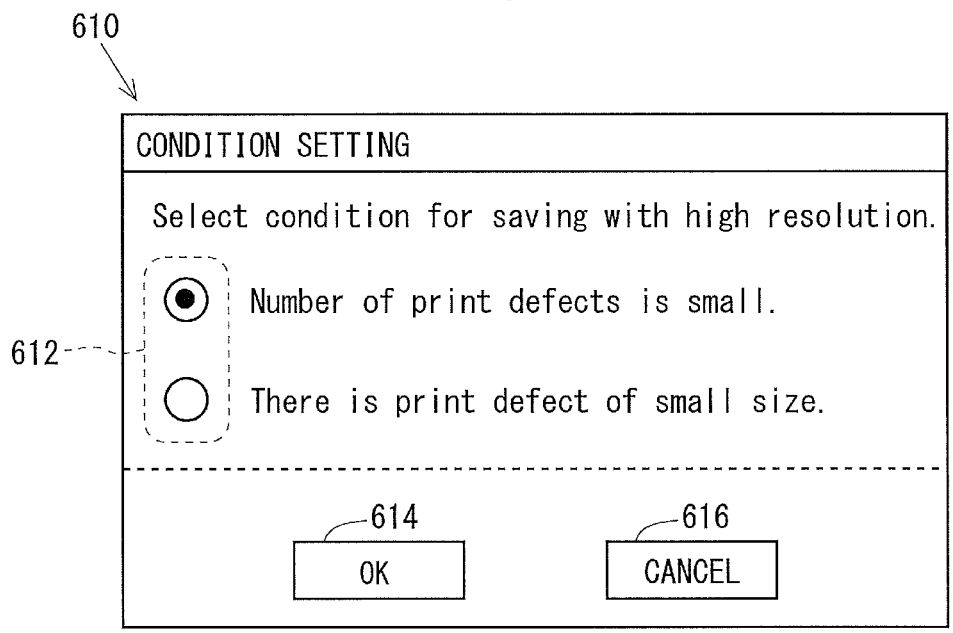
FIG. 13 is a diagram showing an example of a condition setting screen in the fourth embodiment.

In the present embodiment, the condition switching unit 136 displays, for example, a condition setting screen 610 as shown in FIG. 13 on the display unit 147 of the image inspection computer 139. The condition setting screen 610 is provided with a condition selection field 612 for the user to select a condition for setting the recording resolution of the captured image to a high resolution, an OK button 614 for fixing the content of the input (the content of the selection) in the condition selection field 612, and a cancel button 616 for canceling the content of the input (the content of the selection) in the condition selection field 612. In the condition selection field 612, two check boxes corresponding to the two conditions described above are provided.

When the upper check box in the condition selection field 612 is selected by the user, regarding each sheet, the fact that the number of print defects detected by the inspection is smaller than the threshold is set as a condition for saving the captured image at a high resolution. In this case, a captured image regarding a sheet, in which the number of print defects detected by the inspection is smaller than the threshold, is saved with the recording resolution of "200 dpi", and a captured image regarding a sheet, in which the number of print defects detected by the inspection is larger than the threshold, is saved with the recording resolution of "75 dpi". As thus described, as in the second embodiment, the captured image in which no print defect has been detected and the captured image in which a relatively small number of print defects have been detected, are recorded into the image storage unit 135 with a high resolution, and the captured image in which a relatively large number of print defects have been detected is recorded into the image storage unit 135 with a low resolution.

On the other hand, when a lower check box in the condition selection field 612 is selected by the user, regarding each sheet, the fact that a print defect of a size smaller than the threshold has been detected by the inspection is set as a condition for saving the captured image at a high resolution. In this case, the captured image regarding the sheet in which the print defect of the size smaller than the threshold has been detected by the inspection is saved with the recording resolution of "200 dpi", and the captured image regarding the sheet in which only the print defect of the size larger than the threshold has been detected by the inspection is saved with the recording resolution of "75 dpi". As thus described, as in the third embodiment, the captured image in which a small-sized print defect has been detected is recorded into the image storage unit 135 with a high resolution, and the captured image in which only a large-sized print defect has been detected is recorded into the image storage unit 135 with a low resolution. Note that the captured image, in which no print defect has been detected, is recorded into the image storage unit 135 with a high resolution.

4.3 Effects

According to the present embodiment, the user can select a condition for setting a recording resolution of a captured image to a high resolution out of the two conditions. Hence it is possible to more flexibly adapt to the user's request concerning the saving of the captured image. From the above, in the present embodiment as well, the image inspection device (inspection device for inkjet printer 100) 13 capable of dynamically changing a recording resolution so as to efficiently save a captured image for inspection is achieved

4.4 Modification

In the fourth embodiment, the user can select whether to switch the recording resolution in accordance with the number of print defects or to switch the recording resolution in accordance with the size of the print defect. However, the present invention is not limited to such a method. The configuration may be such that a plurality of thresholds to be used at the time of determining the recording resolution are prepared, and the user can select a threshold to be actually applied at the time of determining the recording resolution. Hereinafter, a case where the number of print defects is compared with the threshold at the time of determining the recording resolution will be described as an example.

In the present modification, regarding each sheet, the fact that the number of print defects detected by the inspection is smaller than the threshold for each sheet is set as the condition for saving the captured image with a high resolution. Here, the user can select a value to be actually applied as a threshold at the time of determining the recording resolution out of three values prepared in advance.

Figure 14:
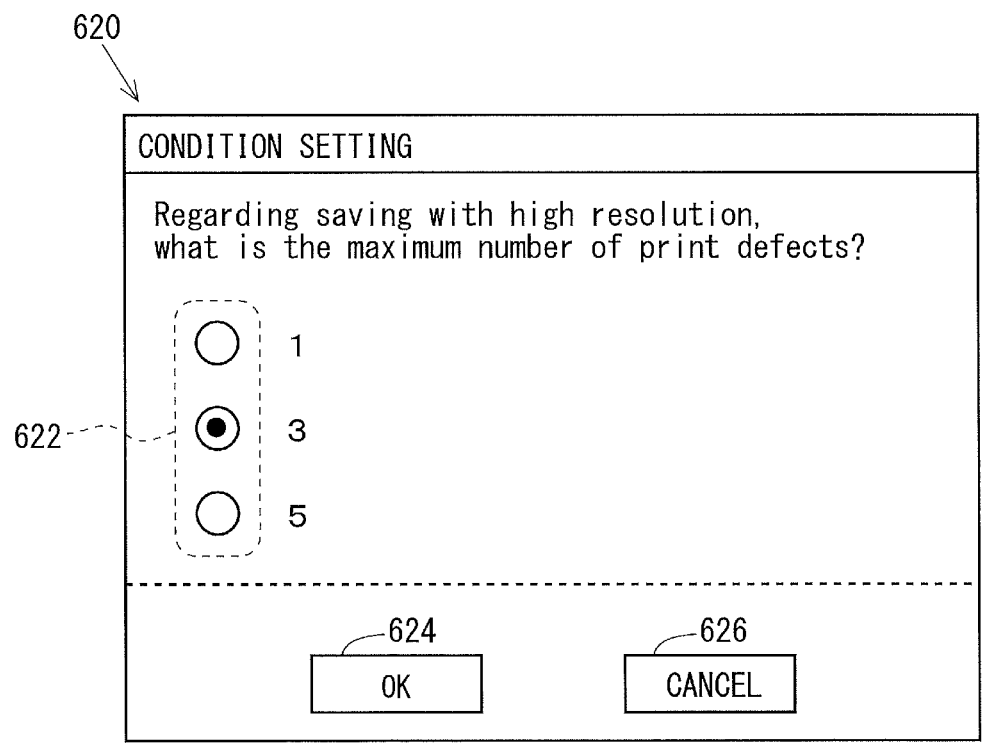
FIG. 14 is a diagram showing an example of the condition setting screen in a modification of the fourth embodiment.

In the present modification, the condition switching unit 136 displays, for example, a condition setting screen 620 as shown in FIG. 14 on the display unit 147 of the image inspection computer 139. The condition setting screen 620 is provided with a condition selection field 622 for the user to select a value to be actually applied as a threshold out of the three values, an OK button 624 for fixing the content of the input (the content of the selection) in the condition selection field 622, and a cancel button 626 for canceling the content of the input (the content of the selection) in the condition selection field 622. In the condition selection field 622, three check boxes corresponding to the three values ("1", "3", "5", here) are provided. Then, on the basis of the value selected by the user, a captured image regarding a sheet, in which the number of print defects detected by the inspection is smaller than the threshold, is saved with the recording resolution of "200 dpi", and a captured image regarding a sheet, in which the number of print defects detected by the inspection is larger than the threshold, is saved with the recording resolution of "75 dpi".

5. FIFTH EMBODIMENT

A fifth embodiment of the present invention will be described. In the present embodiment, when a print defect is detected in a predetermined area by an inspection, a recording resolution is determined on the basis of a browsing history of a previous captured image in which a print defect has been detected in the predetermined area.

5.1 Configuration of Inspection Device

Figure 15:
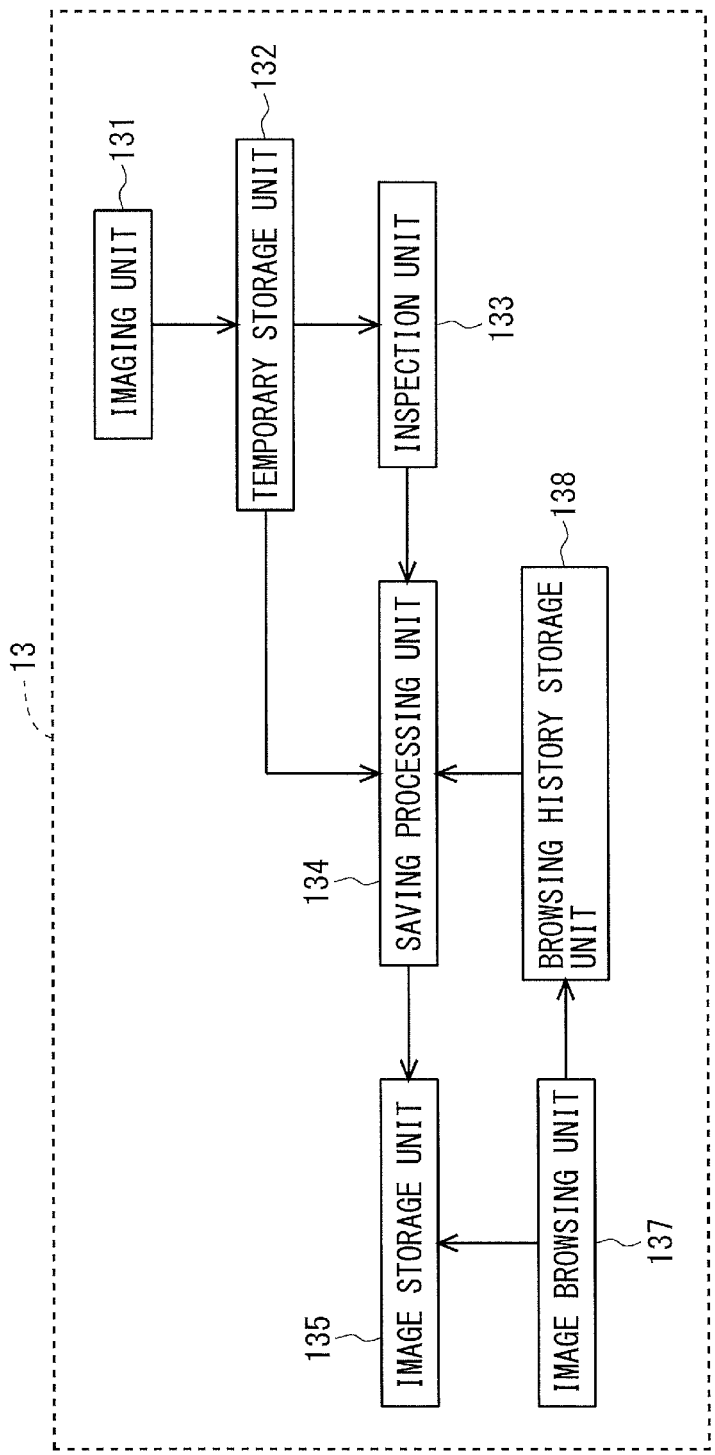
FIG. 15 is a block diagram showing a functional configuration of an image inspection device according to a fifth embodiment of the present invention.

FIG. 15 is a block diagram showing a functional configuration of the image inspection device 13 in the present embodiment. The image inspection device 13 functionally includes an imaging unit 131, the temporary storage unit 132, an inspection unit 133, a saving processing unit 134, the image storage unit 135, an image browsing unit 137, and a browsing history storage unit 138. Note that the temporary storage unit 132, the inspection unit 133, the saving processing unit 134, the image storage unit 135, the image browsing unit 137, and the browsing history storage unit 138 are components provided inside the image inspection computer 139 shown in FIG. 2. The imaging unit 131 captures a printed image (printed printing paper PA). A captured image, obtained by capturing the printed image by the imaging unit 131, is first recorded into the temporary storage unit 132. The inspection unit 133 inspects the captured image recorded in the temporary storage unit 132. In the present embodiment, the inspection performed in the inspection unit 133 is an inspection for detecting print defects.

The image browsing unit 137 has a function of allowing the user to browse the captured image held in the image storage unit 135 (so-called "viewer" function). When a captured image is browsed by the image browsing unit 137, a browsing history relating to the captured image is recorded into the browsing history storage unit 138. The browsing history storage unit 138 holds a browsing history concerning a previous captured image. The saving processing unit 134 records the captured image, recorded in the temporary storage unit 132, into the image storage unit 135. At this time, the saving processing unit 134 determines the recording resolution on the basis of the browsing history held in the browsing history storage unit 138. The image storage unit 135 holds the captured image recorded by the saving processing unit 134.

5.2 Saving Processing

Next, the details of the processing of saving (recording) the captured image into the image storage unit 135 performed by the saving processing unit 134 will be described. In the present embodiment, for example, when the browsing frequency of a previous captured image in which a print defect exists in an area (head area) printed by a certain inkjet head 441 is high, a new captured image in which a print defect has been detected in the head area is recorded into the image storage unit 135 with a high resolution. In order to achieve this, for each inkjet head 441, the ratio (hereinafter referred to as "browsing rate") of the captured images browsed by the image browsing unit 137 during a predetermined period among the previous captured images in which print defects have been detected in the corresponding head area is obtained, as needed. The information of the browsing rate for each inkjet head 441 is held in a table format as shown in FIG. 16, for example.

Here, it is assumed that a setting has been made where "a captured image, in which a print defect has been detected in a head area having a browsing rate of 0.5 or more, is recorded into the image storage unit 135 with a high resolution". It is also assumed that the browsing rate for each inkjet head 441 is as shown in FIG. 16. In this case, for example, a captured image, in which a print defect has been detected in a head area of an inkjet head (2) is saved into the image storage unit 135 with a high resolution. For example, a captured image, in which a print defect has not been detected in the head area of the inkjet head (2) and a print defect has been detected in a head area of an inkjet head (4), is saved into the image storage unit 135 with a low resolution.

As described above, in the present embodiment, when a print defect has been detected in a predetermined area by the inspection by the inspection unit 133, the saving processing unit 134 determines the recording resolution on the basis of a browsing history of a previous captured image in which a print defect has been detected in the predetermined area.

5.3 Effects

According to the present embodiment, the recording resolution at the time of saving the captured image into the image storage unit 135 is determined on the basis of a browsing history of a previous captured image. For example, in a case where a print defect has been detected in a certain head area with respect to a certain captured image (hereinafter referred to as "focused captured image"), when a browsing rate of a previous captured image in which a print defect has been detected in the head area is high, the focused captured image is saved into the image storage unit 135 with a high resolution. As thus described, only a captured image which is likely to be browsed later is saved with a high resolution, so that the captured image can be saved efficiently. As described above, in the present embodiment as well, the image inspection device (inspection device for inkjet printer 100) 13 capable of dynamically changing a recording resolution so as to efficiently save a captured image for inspection is achieved.

6. SIXTH EMBODIMENT

A sixth embodiment of the present invention will be described. In the present embodiment, the recording resolution is determined by a learning model in which machine learning is performed using a previous captured image and a browsing history of the previous captured image.

The functional configuration of the image inspection device 13 is similar to that in the fifth embodiment (see FIG. 15). However, the saving processing unit 134 in the present embodiment includes a browsability discrimination model 1341 (see FIG. 17) as a learning model for determining the browsability of a captured image. In the browsability discrimination model 1341, machine learning is performed in advance by using a previous captured image held in the image storage unit 135 as input data and using, as correct answer data, a value determined on a basis of a browsing history corresponding to the previous captured image, the browsing history being held in the browsing history storage unit 138.

6.1 Browsability Discrimination Model

Figure 17:
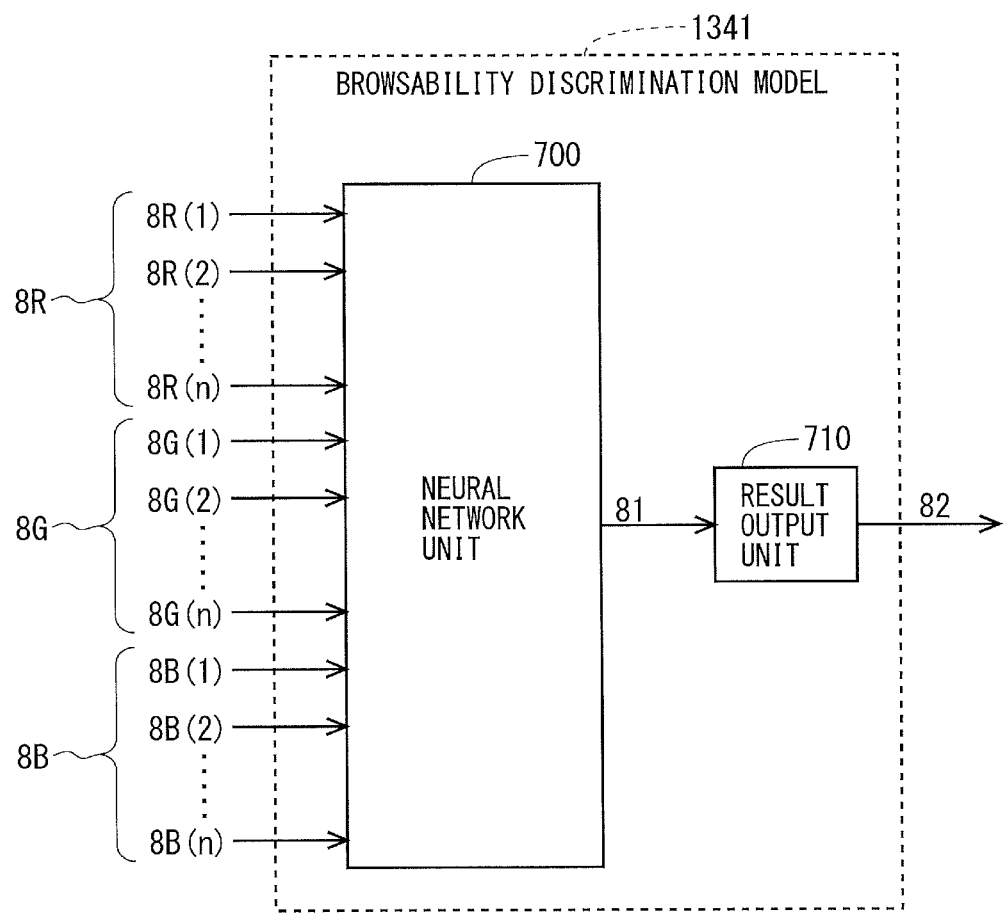
FIG. 17 is a block diagram showing a schematic configuration of a browsability discrimination model in a sixth embodiment of the present invention.
Figure 18:
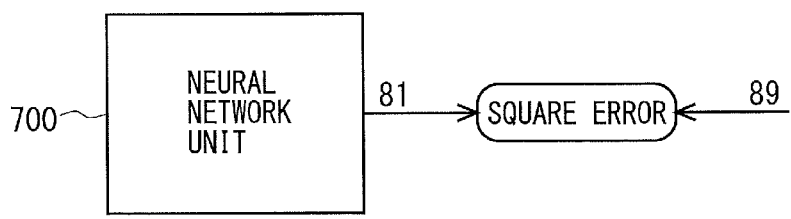
FIG. 18 is a diagram for explaining processing in learning in the sixth embodiment.
Figure 19:
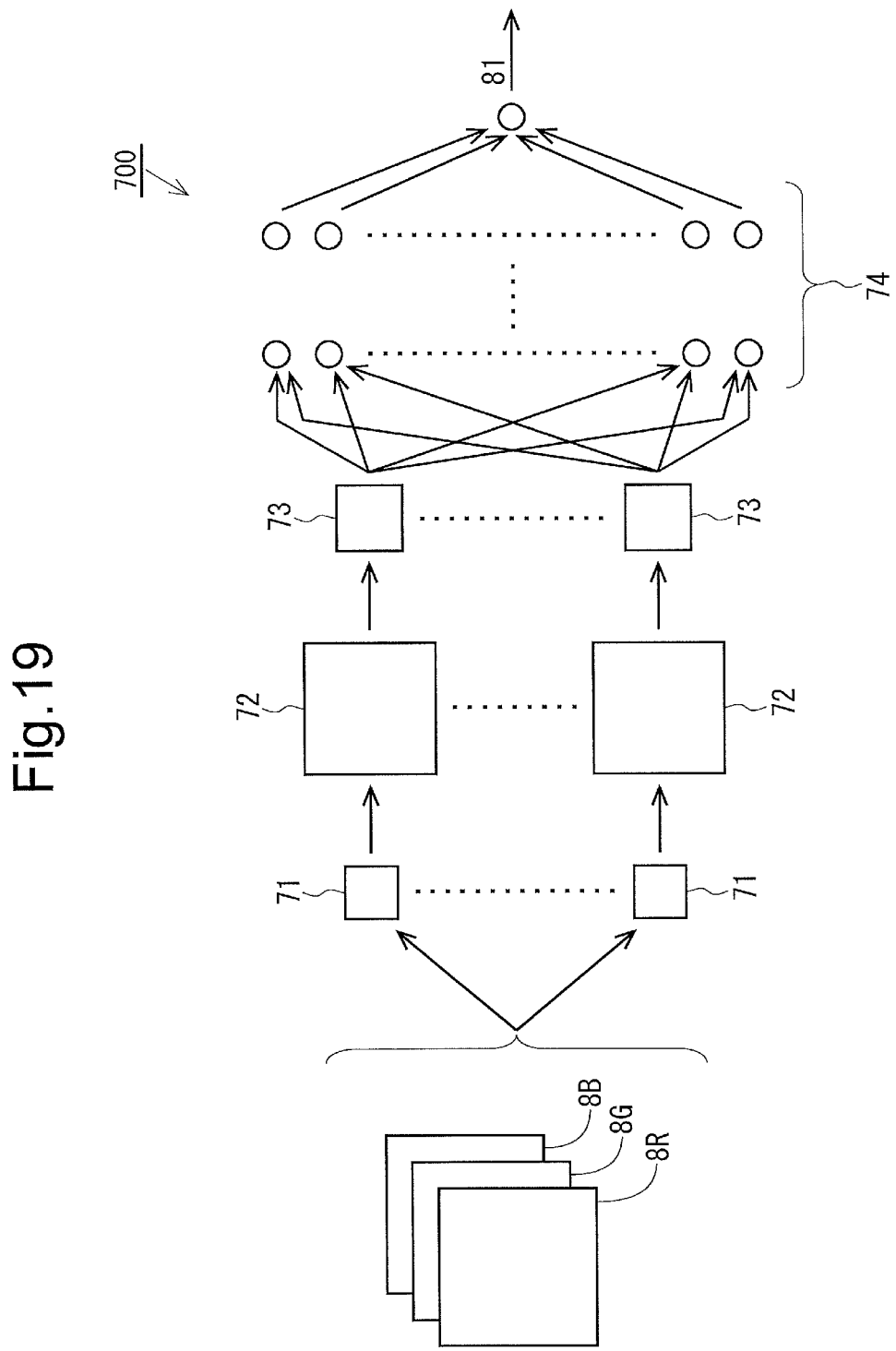
FIG. 19 is a diagram showing an example of a detailed configuration of a neural network unit in the browsability discrimination model in the sixth embodiment.

Referring to FIGS. 17 to 19, the browsability discrimination model 1341 will be described. However, the configuration of the browsability discrimination model 1341 described here is only an example, and the present invention is not limited thereto. FIG. 17 is a schematic configuration diagram of the browsability discrimination model 1341. As shown in FIG. 17, the browsability discrimination model 1341 includes a neural network unit 700 for performing machine learning and a result output unit 710 for outputting a discrimination result 82 of whether or not the browsability of a captured image is high. In the present embodiment, the neural network unit 700 is realized by a convolutional neural network.

The neural network unit 700 is supplied with a previous captured image as input data at the time of learning and supplied with a captured image to be saved as input data at the time of determination. The input data is in RGB format. Therefore, in detail, as shown in FIG. 17, the neural network unit 700 is supplied with an R-color image 8R, a G-color image 8G, and a B-color image 8B as input data.

As above, data for the three colors (primary colors) are inputted into the neural network unit 700. The data for each color is constituted by n (n is multiple) pieces of pixel value data. For example, the R-color image 8R is constituted by n pieces of pixel value data 8R(1) to 8R(n) as shown in FIG. 17. From the above, (3×n) pieces of pixel value data are inputted into the neural network unit 700.

The neural network unit 700 outputs discrimination data 81 for discriminating the browsability of the captured image. The discrimination data 81 is numerical data of 0 or more and 1 or less. At the time of learning, a value of a parameter used in the neural network unit 700 (convolutional neural network) is updated by processing of backpropagation based on the difference (typically, a square error) (see FIG. 18) between the value of the discrimination data 81 and the value of correct answer data 89 (e.g., the value of correct data corresponding to a captured image that has been browsed is set to 1, and the value of correct data corresponding to a captured image that has not been browsed is set to 0.). At the time of discrimination, for example, when the value of the discrimination data 81 is 0.5 or more, a discrimination result 82 that the browsability of the captured image is high is outputted from the result output unit 710, and when the value of the discrimination data 81 is smaller than 0.5, a discrimination result 82 that the browsability of the captured image is low is outputted from the result output unit 710.

FIG. 19 is a diagram showing an example of a detailed configuration of the neural network unit 700 in the browsability discrimination model 1341. When the data for the three colors (R-color image 8R, G-color image 8G, and B-color image 8B) is inputted into the neural network unit 700, a convolution operation based on one set or a plurality of sets of convolution filters 71 is applied to the input data. Note that the one set of convolution filters 71 includes three filters, and one feature map 72 is obtained by the convolution operation based on the one set of convolution filters 71. For example, in a case in which four sets of convolution filters 71 are used, four feature maps 72 are obtained by the convolution operation. By performing a pooling operation on each feature map 72, pooling data 73 with a reduced dimension is obtained. The pooling data 73 thus obtained is supplied to a fully connected layer 74, and the discrimination data 81 described above is outputted from the fully connected layer 74. On the basis of the value of the discrimination data 81, as described above, the parameter is updated at the time of learning, and the discrimination result 82 of whether or not the browsability of the captured image is high is outputted at the time of determination.

6.2 Saving Processing

Next, the details of the processing of saving (recording) the captured image into the image storage unit 135 performed by the saving processing unit 134 will be described.

In the present embodiment, the recording resolution is determined on the basis of output data (discrimination result 82) obtained by supplying a captured image to be saved to the browsability discrimination model 1341 as input data. In the browsability discrimination model 1341, machine learning is performed in advance. Thus, the browsability discrimination model 1341 is configured such that, when a captured image is supplied as input data, the discrimination result 82 indicating whether or not the browsability of the captured image is high is outputted. Therefore, by supplying a captured image to the browsability discrimination model 1341, the recording resolution can be determined on the basis of the browsability of the captured image. Specifically, the saving processing unit 134 determines the recording resolution of the captured image determined to have high browsability to a high resolution, and determines the recording resolution of the captured image determined to have low browsability to a low resolution.

As described above, in the present embodiment, the saving processing unit 134 determines the recording resolution on the basis of the output data (discrimination result 82) obtained by supplying the captured image as input data to the browsability discrimination model 1341.

Figure 20:
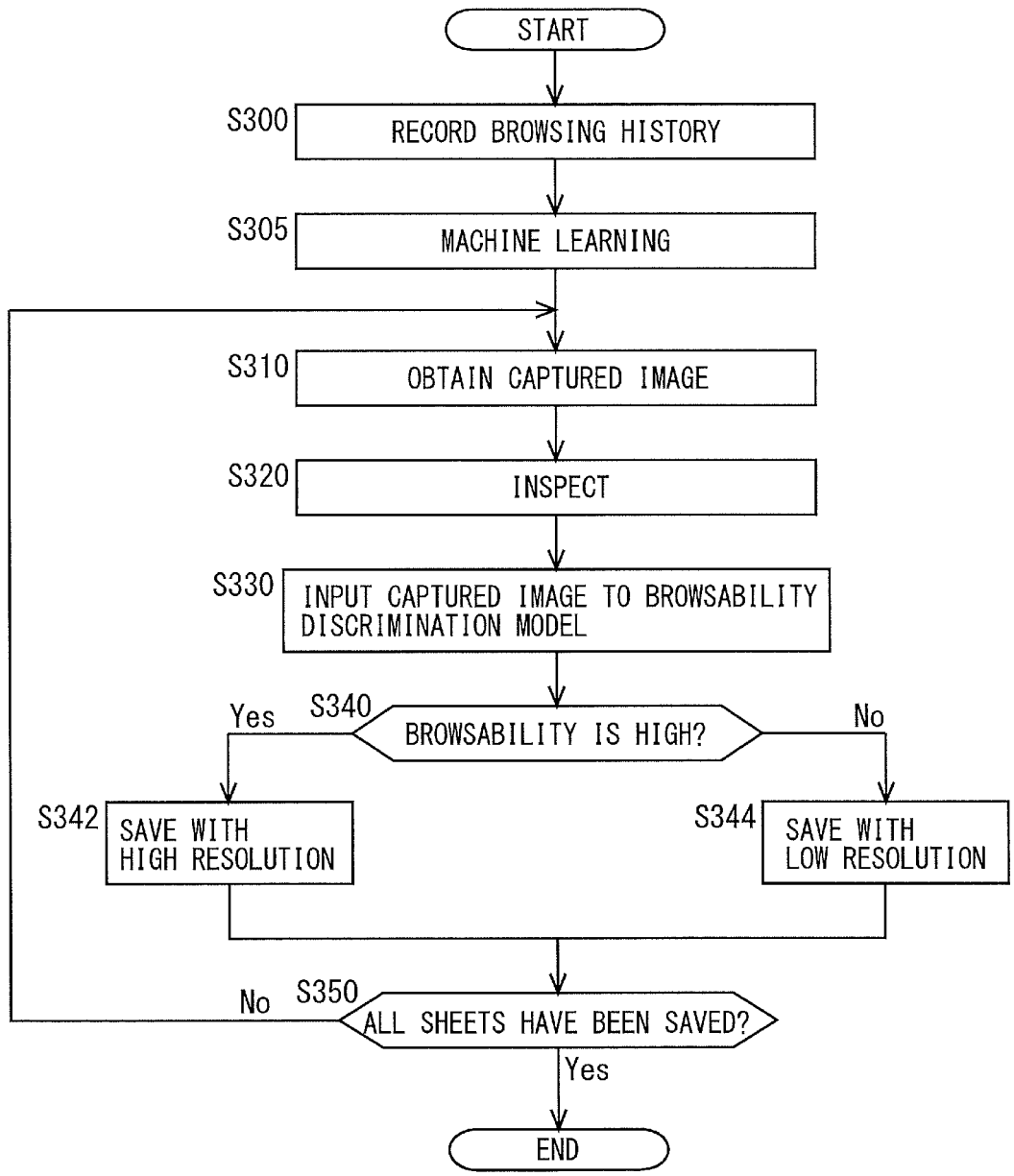
FIG. 20 is a flowchart showing a procedure for a series of processing related to the saving of a captured image in the sixth embodiment.
Figure 21:
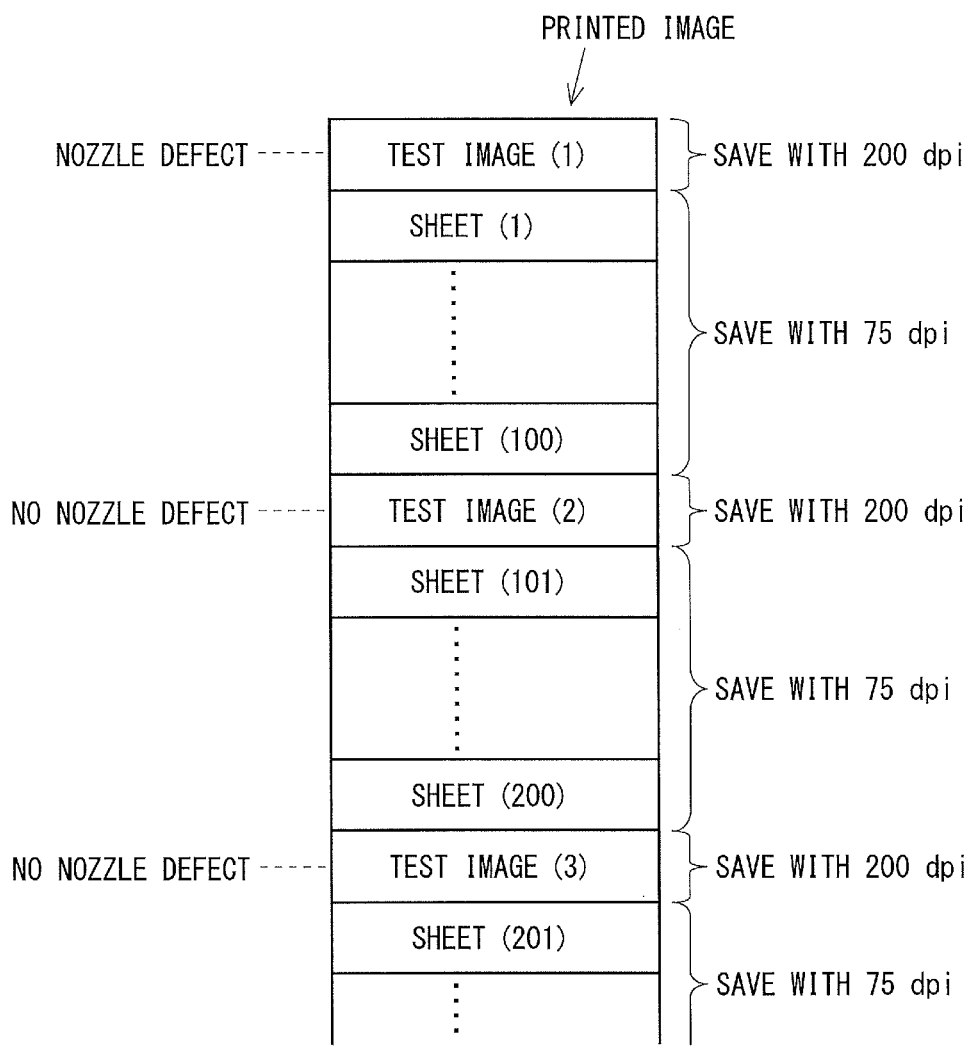
FIG. 21 is a diagram for explaining an image inspection device in which a recording resolution is switched depending on whether or not an image is a test image, regarding a conventional example.

FIG. 20 is a flowchart showing a procedure for a series of processing related to the saving of a captured image. In this regard, before the processing of each sheet (processing of steps S310 to S350) is performed, every time a previous captured image held in the image storage unit 135 is browsed, it is necessary to record the browsing history into the browsing history storage unit 138. FIG. 20 collectively shows, as step S300, the processing of recording the browsing history into the browsing history storage unit 138 every time the captured image is browsed. Further, it is necessary that the learning (machine learning) of the browsability discrimination model 1341 has been performed using the browsing history held in the browsing history storage unit 138 (step S305). On the assumption that the browsing history of the captured image has been stored into the browsing history storage unit 138 and that the browsability discrimination model 1341 has been learned, the processing of each sheet is performed as follows.

First, a captured image for one sheet is obtained (step S310). Next, the inspection unit 133 performs an inspection for detecting print defects, for example (step S320). In the present embodiment, the recording resolution of the captured image does not depend on the result of the inspection in step S320.

Next, the captured image obtained in step S310 is supplied as input data to the browsability discrimination model 1341 (step S330). Thus, the browsability discrimination model 1341 outputs output data (discrimination result 82) indicating browsability. Thereafter, on the basis of the output data, it is determined whether or not the captured image has a high browsability (step S340). As a result, when it is determined that the browsability is high, the processing proceeds to step S342, and when it is determined that the browsability is low, the processing proceeds to step S344.

In step S342, the captured image regarding the target sheet is saved into the image storage unit 135 with a high resolution. In step S344, the captured image regarding the target sheet is saved into the image storage unit 135 with a low resolution. After the completion of step S342 or step S344, the processing proceeds to step S350.

In step S350, it is determined whether or not the captured images for all the sheets have been saved into the image storage unit 135. When the captured images for all the sheets have been saved as a result of the determination in step S350, the series of saving processing is ended, and when there is a captured image having not been saved, the processing returns to step S310.

From the above, for example, when a previous captured image having a certain characteristic has been browsed by the image browsing unit 137 in the past, a captured image having a similar characteristic thereto is saved into the image storage unit 135 with a high resolution. When a previous captured image having another certain characteristic has not been browsed by the image browsing unit 137 in the past, a captured image having a similar characteristic thereto is saved into the image storage unit 135 with a low resolution.

In the present embodiment, the browsing history saving step is realized by step S300, and the saving processing step is realized by steps S330, S340, S342, and S344.

6.3 Effects

According to the present embodiment, the recording resolution at the time of saving the captured image into the image storage unit 135 is determined using the machine-learned browsability discrimination model 1341 on the basis of a browsing history of a previous captured image. Thus, for example, when a previous captured image having a certain characteristic has been browsed in the past, a captured image having a similar characteristic thereto is saved into the image storage unit 135 with a high resolution. As thus described, as in the fifth embodiment, only the captured image which is likely to be browsed later is saved with a high resolution, so that the captured image can be saved efficiently. As described above, in the present embodiment as well, the image inspection device (inspection device for inkjet printer 100) 13 capable of dynamically changing a recording resolution so as to efficiently save a captured image for inspection is achieved.

6.4 Modification

In the sixth embodiment, the browsability discrimination model 1341 is supplied with a captured image as input data. However, the present invention is not limited thereto. Print data corresponding to the captured image (print data transmitted from the print data generator 200 to the inkjet printer 100) may be supplied as input data to the browsability discrimination model 1341. In this case, print data in CMYK format may be supplied to the browsability discrimination model 1341, or print data after converted from CMYK format to RGB format may be supplied to the browsability discrimination model 1341.

In the present modification, at the time of leaning the browsability discrimination model 1341, print data corresponding to each of the previous captured images is supplied as input data to the browsability discrimination model 1341. At the time of determination, print data corresponding to the captured image to be saved is supplied as input data to the browsability discrimination model 1341.

As described above, in the present modification, in the browsability discrimination model 1341, machine learning is performed in advance by using print data corresponding to a previous captured image held in the image storage unit 135 as input data and using, as correct answer data, a value determined on the basis of a browsing history corresponding to the previous captured image, the browsing history being held in the browsing history storage unit 138. Further, the saving processing unit 134 determines the recording resolution on the basis of the output data (discrimination result 82) obtained by supplying, as input data, the print data corresponding to the captured image to the browsability discrimination model 1341.

7. APPENDIX

The following configurations are conceivable from the above disclosure.

Appendix 1

An image inspection device comprising:
an imaging unit configured to capture a printed image;
an inspection unit configured to inspect a captured image obtained by capturing the printed image by the imaging unit;
an image storage unit configured to hold the captured image; and
a saving processing unit configured to record the captured image into the image storage unit,
wherein the saving processing unit determines a recording resolution at a time of recording the captured image into the image storage unit, in accordance with a result of an inspection by the inspection unit.

Appendix 2

The image inspection device according to Appendix 1, wherein
the inspection unit inspects the captured image regarding a test image at predetermined intervals, and
the saving processing unit determines, in accordance with a result of the inspection by the inspection unit at a certain timing, the recording resolution of each captured image until a result of a next inspection by the inspection unit is obtained.

Appendix 3

The image inspection device according to Appendix 2, wherein
the inspection performed by the inspection unit is an inspection for determining occurrence or non-occurrence of nozzle defect,
when it is determined that there is the nozzle defect as a result of the inspection by the inspection unit at a certain timing, the saving processing unit determines the recording resolution of each captured image until the result of the next inspection by the inspection unit is obtained to be a first resolution that is a relatively high resolution, and
when it is determined that there is no nozzle defect as a result of the inspection by the inspection unit at the certain timing, the saving processing unit determines the recording resolution of each captured image until the result of the next inspection by the inspection unit is obtained to be a second resolution that is a relatively low resolution.

Appendix 4

The image inspection device according to Appendix 1, wherein
the inspection unit inspects the captured image for all sheets, and
the saving processing unit determines the recording resolution for each of the sheets.

Appendix 5

The image inspection device according to Appendix 4, wherein
the inspection performed by the inspection unit is an inspection for detecting a print defect, and
the saving processing unit determines the recording resolution of the captured image on a basis of the number of print defects detected by the inspection by the inspection unit.

Appendix 6

The image inspection device according to Appendix 5, wherein
the saving processing unit determines the recording resolution of the captured image regarding a sheet, in which the number of the print defects detected by the inspection by the inspection unit is smaller than a predetermined number, to be a first resolution that is a relatively high resolution, and
the saving processing unit determines the recording resolution of the captured image regarding a sheet, in which the number of the print defects detected by the inspection by the inspection unit is larger than the predetermined number, to be a second resolution that is a relatively low resolution.

Appendix 7

The image inspection device according to Appendix 5, wherein
the saving processing unit determines the recording resolution of the captured image regarding a sheet, in which the number of the print defects detected by the inspection by the inspection unit is smaller than a predetermined number, to be a second resolution that is a relatively low resolution, and
the saving processing unit determines the recording resolution of the captured image regarding a sheet, in which the number of the print defects detected by the inspection by the inspection unit is larger than the predetermined number, to be a first resolution that is a relatively high resolution.

Appendix 8

The image inspection device according to Appendix 4, wherein
the inspection performed by the inspection unit is an inspection for detecting a print defect, and
the saving processing unit determines the recording resolution of the captured image regarding a sheet in which the print defect is detected, on a basis of a size of the print defect detected by the inspection by the inspection unit.

Appendix 9

The image inspection device according to Appendix 8, wherein
the saving processing unit determines the recording resolution of the captured image regarding a sheet, in which the print defect of a size smaller than a predetermined size is detected by the inspection by the inspection unit, to be a first resolution that is a relatively high resolution, and
the saving processing unit determines the recording resolution of the captured image regarding a sheet, in which only the print defect of a size larger than the predetermined size is detected by the inspection by the inspection unit, to be a second resolution that is a relatively low resolution.

Appendix 10

The image inspection device according to Appendix 1, wherein
the inspection performed by the inspection unit is an inspection for detecting a print defect, and
the saving processing unit determines the recording resolution on a basis of a type of the print defect detected by the inspection by the inspection unit.

Appendix 11

The image inspection device according to Appendix 1, wherein the saving processing unit determines the recording resolution for each of areas obtained by dividing a sheet into a plurality of sections.

Appendix 12

The image inspection device according to Appendix 1, wherein
the saving processing unit determines the recording resolution to be one of a first resolution that is a relatively high resolution and a second resolution that is a relatively low resolution, and
when the number of captured images, for which the recording resolution is determined to be the first resolution, is larger than a predetermined threshold, the saving processing unit records only some of the captured images, for which the recording resolution is determined to be the first resolution, into the image storage unit with the first resolution.

Appendix 13

The image inspection device according to Appendix 1, further comprising
a condition switching unit configured to switch a condition related to the determination of the recording resolution in accordance with a selection operation by a user.

Appendix 14

The image inspection device according to Appendix 13, wherein
a first resolution that is a relatively high resolution and a second resolution that is a relatively low resolution are each prepared as the recording resolution that is applicable,
a plurality of conditions are prepared in advance as conditions for determining the recording resolution to be the first resolution, and
the condition switching unit selects a condition that is actually applied when the recording resolution is determined, out of the plurality of conditions.

Appendix 15

An image inspection device comprising:
an imaging unit configured to capture a printed image;
an inspection unit configured to inspect a captured image obtained by capturing the printed image by the imaging unit;
an image storage unit configured to hold the captured image;
a saving processing unit configured to record the captured image into the image storage unit; and
a browsing history storage unit configured to hold a browsing history of the captured image held in the image storage unit,
wherein the saving processing unit determines a recording resolution at a time of recording the captured image into the image storage unit, on a basis of the browsing history held in the browsing history storage unit.

Appendix 16

The image inspection device according to Appendix 15, wherein the inspection performed by the inspection unit is an inspection for detecting a print defect, and when the print defect is detected in a predetermined area by the inspection by the inspection unit, the saving processing unit determines the recording resolution on a basis of the browsing history of a previous captured image in which the print defect is detected in the predetermined area.

Appendix 17

The image inspection device according to Appendix 15, wherein the saving processing unit includes a learning model in which machine learning is performed by using a previous captured image held in the image storage unit as input data and using, as correct answer data, a value determined on a basis of the browsing history corresponding to the previous captured image, the browsing history being held in the browsing history storage unit, and the saving processing unit determines the recording resolution on a basis of output data obtained by supplying the captured image as the input data to the learning model.

Appendix 18

The image inspection device according to Appendix 15, wherein the saving processing unit includes a learning model in which machine learning is performed by using, as input data, print data corresponding to a previous captured image held in the image storage unit and using, as correct answer data, a value determined on a basis of the browsing history corresponding to the previous captured image, the browsing history being held in the browsing history storage unit, and the saving processing unit determines the recording resolution on a basis of output data obtained by supplying the print data corresponding to the previous captured image as the input data to the learning model.

Appendix 19

The image inspection device according to Appendix 17 or 18, wherein in the learning model, machine learning is performed by using data indicating whether a previous captured image is browsed, as correct answer data, and the learning model outputs data indicating whether browsability of the captured image is high, as the output data.

Appendix 20

A printer comprising:

a printing unit configured to perform printing on a recording medium;

an imaging unit configured to capture a printed image obtained by the printing by the printing unit;

an inspection unit configured to inspect a captured image obtained by capturing the printed image by the imaging unit;

an image storage unit configured to hold the captured image; and a saving processing unit configured to record the captured image into the image storage unit, wherein the saving processing unit determines a recording resolution at a time of recording the captured image into the image storage unit, in accordance with a result of an inspection by the inspection unit.

Appendix 21

A printer comprising:

a printing unit configured to perform printing on a recording medium;

an imaging unit configured to capture a printed image obtained by the printing by the printing unit;

an inspection unit configured to inspect a captured image obtained by capturing the printed image by the imaging unit;

an image storage unit configured to hold the captured image;

a saving processing unit configured to record the captured image into the image storage unit; and a browsing history storage unit configured to hold a browsing history of the captured image held in the image storage unit, wherein the saving processing unit determines a recording resolution at a time of recording the captured image into the image storage unit, on a basis of the browsing history held in the browsing history storage unit.

Appendix 22

A saving processing method for a captured image obtained by capturing a printed image, the method comprising:

an inspection step of inspecting the captured image; and a saving processing step of recording the captured image into a previously prepared image storage unit, wherein, in the saving processing step, a recording resolution at a time of recording the captured image into the image storage unit is determined in accordance with a result of an inspection in the inspection step.

Appendix 23

A saving processing method for a captured image obtained by capturing a printed image, the method comprising:

a saving processing step of recording the captured image into a previously prepared image storage unit; and a browsing history saving step of recording a browsing history of the captured image held in the image storage unit into a previously prepared browsing history storage unit, wherein, in the saving processing step, a recording resolution at a time of recording the captured image into the image storage unit is determined on the basis of a browsing history of a previous captured image held in the browsing history storage unit.

8. OTHERS

Although the present invention has been described in detail above, the above description is illustrative in all aspects and is not restrictive. It is understood that numerous other modifications and variations can be devised without departing from the scope of the present invention. For example, although the recording resolution is switched between the high resolution and the low resolution in each of the above embodiments, the recording resolution can also be switched among three or more levels of resolution. Further, each of the above embodiments and each of the above modifications can be appropriately combined so as not to cause contradiction. For example, the method of the first modification of the first embodiment can be applied to the second embodiment.

Note that this application claims priority based on Japanese Patent Application No. 2020-51303 filed on Feb. 28, 2020 and entitled "IMAGE INSPECTION DEVICE, PRINTER, AND SAVING PROCESSING METHOD FOR CAPTURED IMAGE", the content of which is incorporated herein by reference.

What is claimed is:

1. An image inspection device comprising:
   an image sensor for capturing a printed image;
   a central processing unit (CPU); and
   a memory storing a program that, when executed by the CPU, causes the CPU to:
      inspect a captured image obtained by capturing the printed image by the image sensor; and
      record, in an image data storage, the captured image, wherein the CPU determines a recording resolution at a time of recording the captured image into the image data storage, in accordance with a result of the inspection of the captured image.

2. The image inspection device according to claim 1, wherein
   the CPU inspects the captured image regarding a test image at predetermined intervals, and
   the CPU determines, in accordance with a result of the inspection of the captured image at a certain timing, the recording resolution of each captured image until a result of a next inspection is obtained.

3. The image inspection device according to claim 2, wherein
   the inspection performed by the CPU is an inspection for determining occurrence or non-occurrence of nozzle defect,
   when it is determined that there is the nozzle defect as a result of the inspection by the CPU at a certain timing, the CPU determines the recording resolution of each captured image until the result of the next inspection by the CPU is obtained to be a first resolution that is a relatively high resolution, and
   when it is determined that there is no nozzle defect as a result of the inspection by the CPU at the certain timing, the CPU determines the recording resolution of each captured image until the result of the next inspection by the CPU is obtained to be a second resolution that is a relatively low resolution.

4. The image inspection device according to claim 1, wherein
   the CPU inspects the captured image for all sheets, and
   the CPU determines the recording resolution for each of the sheets.

5. The image inspection device according to claim 4, wherein
   the inspection performed by the CPU is an inspection for detecting a print defect, and
   the CPU determines the recording resolution of the captured image on a basis of the number of print defects detected by the inspection by the CPU.

6. The image inspection device according to claim 5, wherein
   the CPU determines the recording resolution of the captured image regarding a sheet, in which the number of the print defects detected by the inspection by the CPU is smaller than a predetermined number, to be a first resolution that is a relatively high resolution, and
   the CPU determines the recording resolution of the captured image regarding a sheet, in which the number of the print defects detected by the inspection by the CPU is larger than the predetermined number, to be a second resolution that is a relatively low resolution.

7. The image inspection device according to claim 5, wherein
   the CPU determines the recording resolution of the captured image regarding a sheet, in which the number of the print defects detected by the inspection by the CPU is smaller than a predetermined number, to be a second resolution that is a relatively low resolution, and
   the CPU determines the recording resolution of the captured image regarding a sheet, in which the number of the print defects detected by the inspection by the CPU is larger than the predetermined number, to be a first resolution that is a relatively high resolution.

8. The image inspection device according to claim 4, wherein
   the inspection performed by the CPU is an inspection for detecting a print defect, and
   the CPU determines the recording resolution of the captured image regarding a sheet in which the print defect is detected, on a basis of a size of the print defect detected by the inspection by the CPU.

9. The image inspection device according to claim 8, wherein
   the CPU determines the recording resolution of the captured image regarding a sheet, in which the print defect of a size smaller than a predetermined size is detected by the inspection by the CPU, to be a first resolution that is a relatively high resolution, and
   the CPU determines the recording resolution of the captured image regarding a sheet, in which only the print defect of a size larger than the predetermined size is detected by the inspection by the CPU, to be a second resolution that is a relatively low resolution.

10. The image inspection device according to claim 1, wherein
    the inspection performed by the CPU is an inspection for detecting a print defect, and
    the CPU determines the recording resolution on a basis of a type of the print defect detected by the inspection by the CPU.

11. The image inspection device according to claim 1, wherein the CPU determines the recording resolution for each of areas obtained by dividing a sheet into a plurality of sections.

12. The image inspection device according to claim 1, wherein
    the CPU determines the recording resolution to be one of a first resolution that is a relatively high resolution and a second resolution that is a relatively low resolution, and
    when the number of captured images, for which the recording resolution is determined to be the first resolution, is larger than a predetermined threshold, the CPU records only some of the captured images, for which the recording resolution is determined to be the first resolution, into the image data storage with the first resolution.

13. The image inspection device according to claim 1, wherein the CPU is further configured to switch a condition related to the determination of the recording resolution in accordance with a selection operation by a user.

14. The image inspection device according to claim 13, wherein
a first resolution that is a relatively high resolution and a second resolution that is a relatively low resolution are each prepared as the recording resolution that is applicable,
a plurality of conditions are prepared in advance as conditions for determining the recording resolution to be the first resolution, and
the CPU selects a condition that is actually applied when the recording resolution is determined, out of the plurality of conditions.

15. An image inspection device comprising:
an image sensor for capturing a printed image;
a central processing unit (CPU); and
a memory storing a program that, when executed by the CPU, causes the CPU to:
inspect a captured image obtained by capturing the printed image by the image sensor;
record the captured image into an image data storage; and
store, in a browsing history storage, a browsing history of the captured image held in the image data storage,
wherein the CPU determines a recording resolution at a time of recording the captured image into the image data storage, on a basis of the browsing history held in the browsing history storage.

16. The image inspection device according to claim 15, wherein
the inspection performed by the CPU is an inspection for detecting a print defect, and
when the print defect is detected in a predetermined area by the inspection by the CPU, the CPU determines the recording resolution on a basis of the browsing history of a previous captured image in which the print defect is detected in the predetermined area.

17. The image inspection device according to claim 15, wherein
the CPU includes a learning model in which machine learning is performed by using a previous captured image held in the image data storage as input data and using, as correct answer data, a value determined on a basis of the browsing history corresponding to the previous captured image, the browsing history being held in the browsing history storage, and
the CPU determines the recording resolution on a basis of output data obtained by supplying the captured image as the input data to the learning model.

18. The image inspection device according to claim 15, wherein
the CPU includes a learning model in which machine learning is performed by using, as input data, print data corresponding to a previous captured image held in the image data storage and using, as correct answer data, a value determined on a basis of the browsing history corresponding to the previous captured image, the browsing history being held in the browsing history storage, and
the CPU determines the recording resolution on a basis of output data obtained by supplying the print data corresponding to the previous captured image as the input data to the learning model.

19. The image inspection device according to claim 17, wherein
in the learning model, machine learning is performed by using data indicating whether a previous captured image is browsed, as correct answer data, and
the learning model outputs data indicating whether browsability of the captured image is high, as the output data.

20. A saving processing method for a captured image obtained by capturing a printed image, the method comprising:
an inspection step of performing an inspection for detecting at least one of occurrence or non-occurrence of a print defect, the number of print defects, a size of the print defect, and a type of the print defect as an inspection of the captured image; and
a saving processing step of recording the captured image into a previously prepared image data storage,
wherein, in the saving processing step, a recording resolution at a time of recording the captured image into the image data storage is determined in accordance with a result of the inspection in the inspection step.

* * * * *